(12) United States Patent
Li et al.

(10) Patent No.: US 12,055,687 B2
(45) Date of Patent: Aug. 6, 2024

(54) CAMERA LENS ASSEMBLY

(71) Applicant: ZHEJIANG SUNNY OPTICS CO., LTD., Zhejiang (CN)

(72) Inventors: Yanping Li, Zhejiang (CN); Lingbo He, Zhejiang (CN); Fujian Dai, Zhejiang (CN); Liefeng Zhao, Zhejiang (CN)

(73) Assignee: ZHEJIANG SUNNY OPTICS CO., LTD., Ningbo (CN)

( * ) Notice: Subject to any disclaimer, the term of this patent is extended or adjusted under 35 U.S.C. 154(b) by 609 days.

(21) Appl. No.: 17/333,024

(22) Filed: May 28, 2021

(65) Prior Publication Data

US 2021/0405325 A1 Dec. 30, 2021

(30) Foreign Application Priority Data

Jun. 27, 2020 (CN) .......................... 202010593331.6

(51) Int. Cl.
  *G02B 13/00* (2006.01)
  *G02B 9/64* (2006.01)
(52) U.S. Cl.
  CPC ........... *G02B 13/0045* (2013.01); *G02B 9/64* (2013.01)
(58) Field of Classification Search
  CPC ............................... G02B 13/0045; G02B 9/64

USPC .......................................................... 359/754
See application file for complete search history.

(56) References Cited

U.S. PATENT DOCUMENTS

| 2015/0309293 A1* | 10/2015 | Yamada | H04N 23/663 348/340 |
| 2016/0202461 A1* | 7/2016 | Uchida | G02B 21/02 359/656 |
| 2017/0307858 A1* | 10/2017 | Chen | G02B 13/18 |
| 2018/0299653 A1* | 10/2018 | Kubota | G02B 9/64 |

* cited by examiner

*Primary Examiner* — William R Alexander
*Assistant Examiner* — Sharrief I Broome
(74) *Attorney, Agent, or Firm* — Samson G. Yu

(57) ABSTRACT

The disclosure provides a camera lens assembly, which includes nine lenses, sequentially including from an object side to an image side: a first lens with a refractive power, an object-side surface thereof is a convex surface; a second lens with a refractive power; a third lens with a positive refractive power; a fourth lens with a refractive power; a fifth lens with a refractive power; a sixth lens with a refractive power; a seventh lens with a negative refractive power; an eighth lens with a refractive power; and a ninth lens with a refractive power; an on-axis distance TTL from an object-side surface of the first lens to an imaging surface of the camera lens assembly on the optical axis and an effective focal length f of the camera lens assembly satisfy TTL/f<1.1.

18 Claims, 20 Drawing Sheets longitudinal aberration curve (millimeter)

longitudinal aberration curve (millimeter)

CAMERA LENS ASSEMBLY

CROSS-REFERENCE TO RELATED PRESENT INVENTION(S)

The disclosure claims priority to and the benefit of Chinese Patent Present invention No. 202010593331.6, filed in the China National Intellectual Property Administration (CNIPA) on 27 Jun. 2020, which is incorporated herein by reference in its entirety.

TECHNICAL FIELD

The disclosure relates to a camera lens assembly, and particularly to a camera lens assembly including nine lenses.

BACKGROUND

In 2000, Sharp launched the world's first camera phone with a 110,000-pixel rear camera. A new auto-focus function for photographing with mobile phones has been continued to the present day since realized by Sony Ericsson in 2005. Over the next more than ten years, cameras of mobile phones have been rapidly developed with the development of smart phones, from 8 mega-pixels in 2010 to 100 mega-pixels in 2020 and from single-lens cameras a few years ago to present combined multi-lens cameras. New developments may be made regularly to photographing with mobile phones, and more surprising functions may be brought to people every time.

Telephoto lens, as one of present multi-lens imaging cameras, has the following unique features: 1, the telephoto lens may zoom in on a subject to make a picture concise and remove a picture content that a user does not want; 2, a spatial distance of a distant scenery and a close scenery may be shortened to obtain a compact picture of front and rear sceneries that are far away from each other, thereby achieving a space compression effect; and 3, bokeh may be achieved. Due to these unique features, telephoto lens becomes an indispensable tool for the majority of users keen to shoot portraits, wild animals and the moon. With the constant development of portable electronic products such as smart phones, requirements of users on the performance of camera lens assembly assemblies of mobile phones have also increased. A camera lens assembly with multiple lenses that provides a higher degree of design freedom makes it more possible to improve the performance of a mobile phone.

Therefore, by reasonable configuration of refractive power and optimized selection of high-order aspheric parameters, the disclosure provides a camera lens assembly with nine lenses applicable to a portable electronic product and with a telephoto feature and a compact structure. Due to the feature of compact structure of the camera lens assembly with nine lenses, an ultrathin design of a mobile phone is also ensured on the premise that the optical performance is fully improved, and higher adaptability to a market requirement and a trend of development of mobile phones to ultrathin designs is achieved.

SUMMARY

Based on the foregoing problem, some embodiments of the disclosure provide an optical lens with nine lenses, which is a camera lens assembly with telephoto feature and compact structure compared with a related art. Due to the feature of compact structure of the camera lens assembly with nine lenses, an ultrathin design of a mobile phone is ensured on the premise that the optical performance is fully improved, and higher adaptability to a market requirement and a trend of development of mobile phones to ultrathin designs is achieved.

One embodiment of the disclosure provides a camera lens assembly, which sequentially includes from an object side to an image side along an optical axis: a first lens, a second lens, a third lens, a fourth lens, a fifth lens, a sixth lens, a seventh lens, an eighth lens and a ninth lens with refractive power respectively. Wherein an object-side surface of the first lens is a convex surface; and the seventh lens may have a negative refractive power.

In an implementation mode, an on-axis distance TTL from an object-side surface of the first lens to an imaging surface of the camera lens assembly and an effective focal length f of the camera lens assembly satisfy $TTL/f<1.1$.

In an implementation mode, an effective focal length f7 of the seventh lens and an effective focal length f9 of the ninth lens satisfy $0.7<f7/f9<1.3$.

In an implementation mode, an effective focal length f1 of the first lens and an effective focal length f of the camera lens assembly satisfy $0.5<f1/f<1$.

In an implementation mode, an image-side surface of the seventh lens is a concave surface.

In an implementation mode, a curvature radius R13 of an object-side surface of the seventh lens and an effective focal length f of the camera lens assembly satisfy $-5<R13/f<0$.

In an implementation mode, a maximum effective semi-diameter DT92 of an image-side surface of the ninth lens and an on-axis distance TD from the object-side surface of the first lens to the image-side surface of the ninth lens satisfy $DT92/TD<0.5$.

In an implementation mode, a maximum effective semi-diameter DT32 of an image-side surface of the third lens and a maximum effective semi-diameter DT41 of an object-side surface of the fourth lens satisfy $1<DT32/DT41<1.5$.

In an implementation mode, a curvature radius R8 of an image-side surface of the fourth lens and an effective focal length f4 of the fourth lens satisfy $-0.7<R8/f4<-0.2$.

In an implementation mode, a center thickness CT5 of the fifth lens and a sum $\Sigma CT$ of respective thicknesses of the first lens to the ninth lens on the optical axis satisfy $0.15<CT5/\Sigma CT<0.5$.

In an implementation mode, ImgH is a half the diagonal length of an effective pixel area of the electronic photosensitive element, ImgH and a maximum effective semi-diameter DT11 of the object-side surface of the first lens satisfy $0.5<DT11/ImgH<1$.

In an implementation mode, a center thickness CT6 of the sixth lens and a center thickness CT7 of the seventh lens satisfy $2<CT6/CT7<3.5$.

In an implementation mode, a center thickness CT3 of the third lens and an edge thickness ET3 of the third lens satisfy $1.8<CT3/ET3<3$.

In an implementation mode, a curvature radius R11 of an object-side surface of the sixth lens and a curvature radius R12 of an image-side surface of the sixth lens satisfy $0.9<R11/R12<1.5$.

In an implementation mode, SAG51 is a spacing distance from an intersection point of an object-side surface of the fifth lens and the optical axis to an effective radius vertex of the object-side surface of the fifth lens on the optical axis, SAG51 and a center thickness CT5 of the fifth lens satisfy $0.1<SAG51/CT5<0.5$.

In an implementation mode, an on-axis distance Tr9r12 from an object-side surface of the fifth lens to an image-side surface of the sixth lens and an on-axis distance Tr13r18 from an object-side surface of the seventh lens to an image-side surface of the ninth lens satisfy $0.9<\text{Tr}9r12/\text{Tr}13r18<1.6$.

In an implementation mode, a center thickness CT2 of the second lens and a center thickness CT3 of the third lens satisfy $CT2/CT3<0.6$.

In an implementation mode, an on-axis distance BFL from an image-side surface of the ninth lens to an imaging surface of the camera lens assembly, an on-axis distance TTL from an object-side surface of the first lens to an imaging surface of the camera lens assembly satisfy $0.1<\text{BFL/TTL}<0.25$.

In an implementation mode, a spacing distance T45 from the fourth lens to the fifth lens on the optical axis, a spacing distance T56 from the fifth lens to the sixth lens on the optical axis, a spacing distance T67 from the sixth lens to the seventh lens on the optical axis and the on-axis distance TTL from the object-side surface of the first lens to the imaging surface of the camera lens assembly satisfy $2<10\times(T45+T56+T67)/TTL<3$.

In an implementation mode, a maximum field of view (FOV) of the camera lens assembly satisfies $39°<\text{FOV}<48°$.

Another embodiment of the disclosure provides a camera lens assembly, which includes nine lenses, the nine lenses sequentially include from an object side to an image side: a first lens with a refractive power, an object-side surface thereof is a convex surface; a second lens with a refractive power; a third lens with a positive refractive power; a fourth lens with a negative refractive power, an image-side surface thereof is a concave surface; a fifth lens with a refractive power; a sixth lens with a refractive power; a seventh lens with a negative refractive power; an eighth lens with a refractive power; and a ninth lens with a refractive power; wherein there is an air space between two adjacent lenses.

In an implementation mode, an image-side surface of the seventh lens is a concave surface, and a curvature radius R13 of an object-side surface of the seventh lens, an effective focal length f of the camera lens assembly, a maximum effective semi-diameter DT92 of an image-side surface of the ninth lens and an on-axis distance TD from the object-side surface of the first lens to the image-side surface of the ninth lens satisfy:

$-5<R13/f<0$; and $DT92/TD<0.5$.

In an implementation mode, a maximum effective semi-diameter DT32 of an image-side surface of the third lens, a maximum effective semi-diameter DT41 of an object-side surface of the fourth lens, a curvature radius R8 of the image-side surface of the fourth lens and an effective focal length f4 of the fourth lens satisfy:

$1<DT32/DT41<1.5$; and $-0.7<R8/f4<-0.2$.

In an implementation mode, ImgH is a half the diagonal length of an effective pixel area of the electronic photosensitive element, ImgH, a center thickness CT5 of the fifth lens, a sum $\Sigma CT$ of respective thicknesses of the first lens to the ninth lens on an optical axis and a maximum effective semi-diameter DT11 of the object-side surface of the first lens satisfy:

$0.15<CT5/\Sigma CT<0.5$; and $0.5<DT11/\text{ImgH}<1$.

In an implementation mode, a curvature radius R11 of an object-side surface of the sixth lens and a curvature radius R12 of an image-side surface of the sixth lens satisfy $0.9<R11/R12<1.5$.

In an implementation mode, SAG51 is a spacing distance from an intersection point of an object-side surface of the fifth lens and the optical axis to an effective radius vertex of the object-side surface of the fifth lens on the optical axis, SAG51 and a center thickness CT5 of the fifth lens satisfy $0.1<SAG51/CT5<0.5$.

In an implementation mode, an on-axis distance BFL from an image-side surface of the ninth lens to an imaging surface of the camera lens assembly on the optical axis and an on-axis distance TTL from an object-side surface of the first lens to an imaging surface of the camera lens assembly on the optical axis satisfy $0.1<\text{BFL/TTL}<0.25$.

In an implementation mode, an on-axis spacing distance T45 from the fourth lens to the fifth lens, an on-axis spacing distance T56 from the fifth lens to the sixth lens, an on-axis spacing distance T67 from the sixth lens to the seventh lens and the on-axis distance TTL from the object-side surface of the first lens to the imaging surface of the camera lens assembly satisfy $2<10\times(T45+T56+T67)/TTL<3$.

In an implementation mode, a maximum field of view FOV of the camera lens assembly, a maximum effective semi-diameter DT92 of an image-side surface of the ninth lens and on-axis distance TD from the object-side surface of the first lens to the image-side surface of the ninth lens satisfy:

$39°<\text{FOV}<48°$; and $DT92/TD<0.5$.

Another embodiment of the disclosure provides a camera lens assembly, which includes nine lenses, the nine lenses sequentially include from an object side to an image side: a first lens with a refractive power, an object-side surface thereof is a convex surface; a second lens with a refractive power; a third lens with a positive refractive power; a fourth lens with a negative refractive power; a fifth lens with a refractive power; a sixth lens with a refractive power; a seventh lens with a negative refractive power; an eighth lens with a refractive power; and a ninth lens with a refractive power; wherein an on-axis distance Tr9r12 from an object-side surface of the fifth lens to an image-side surface of the sixth lens and an on-axis distance Tr13r18 from an object-side surface of the seventh lens to an image-side surface of the ninth lens satisfy $0.9<\text{Tr}9r12/\text{Tr}13r18<1.6$.

In an implementation mode, an image-side surface of the seventh lens is a concave surface; and a curvature radius R13 of an object-side surface of the seventh lens and an effective focal length f of the camera lens assembly satisfy $-5<R13/f<0$.

In an implementation mode, a maximum effective semi-diameter DT92 of an image-side surface of the ninth lens and an on-axis distance TD from the object-side surface of the first lens to the image-side surface of the ninth lens satisfy $DT92/TD<0.5$.

In an implementation mode, an effective focal length f7 of the seventh lens and an effective focal length f9 of the ninth lens satisfy $0.7<f7/f9<1.3$.

In an implementation mode, a spacing distance T45 from the fourth lens to the fifth lens on the optical axis, a spacing distance T56 from the fifth lens to the sixth lens on the optical axis, a spacing distance T67 from the sixth lens to the seventh lens on the optical axis and the on-axis distance TTL from the object-side surface of the first lens to the imaging surface of the camera lens assembly satisfy $2<10\times(T45+T56+T67)/TTL<3$.

In an implementation mode, an on-axis distance BFL from an image-side surface of the ninth lens to an imaging surface of the camera lens assembly, an on-axis distance TTL from an object-side surface of the first lens to an imaging surface of the camera lens assembly satisfy:

$0.5<f1/f<1$; and $0.1<BFL/TTL<0.25$.

In an implementation mode, an on-axis distance BFL from an image-side surface of the ninth lens to an imaging surface of the camera lens assembly, an on-axis distance TTL from an object-side surface of the first lens to an imaging surface of the camera lens assembly, a center thickness CT2 of the second lens and a center thickness CT3 of the third lens satisfy:

$0.1<BFL/TTL<0.25$; and $CT2/CT3<0.6$.

In an implementation mode, SAG51 is an on-axis spacing distance from an intersection point of an object-side surface of the fifth lens and the optical axis to an effective radius vertex of the object-side surface of the fifth lens, SAG51, a center thickness CT5 of the fifth lens and a sum $\Sigma CT$ of respective thicknesses of the first lens to the ninth lens on an optical axis, satisfy:

$0.15<CT5/\Sigma CT<0.5$; and $0.1<SAG51/CT5<0.5$.

In an implementation mode, ImgH is a half the diagonal length of an effective pixel area of the electronic photosensitive element, ImgH, a maximum effective semi-diameter DT11 of the object-side surface of the first lens, a curvature radius R11 of an object-side surface of the sixth lens and a curvature radius R12 of an image-side surface of the sixth lens satisfy:

$0.5<DT11/ImgH<1$; and $0.9<R11/R12<1.5$.

Another embodiment of the disclosure provides a camera lens assembly, which includes nine lenses, the nine lenses sequentially include from an object side to an image side: a first lens with a refractive power, an object-side surface thereof is a convex surface; a second lens with a refractive power; a third lens with a positive refractive power; a fourth lens with a negative refractive power; a fifth lens with a refractive power; a sixth lens with a refractive power; a seventh lens with a refractive power; an eighth lens with a positive refractive power; and a ninth lens with a negative refractive power; wherein a center thickness CT3 of the third lens and an edge thickness ET3 of the third lens satisfy $1.8<CT3/ET3<3$.

In an implementation mode, SAG51 is an on-axis spacing distance from an intersection point of an object-side surface of the fifth lens and the optical axis to an effective radius vertex of the object-side surface of the fifth lens, SAG51 and a center thickness CT5 of the fifth lens satisfy $0.1<SAG51/CT5<0.5$.

In an implementation mode, a curvature radius R11 of an object-side surface of the sixth lens and a curvature radius R12 of an image-side surface of the sixth lens satisfy $0.9<R11/R12<1.5$.

The disclosure has the following positive effects: with adoption of the technical solutions provided in the disclosure, through an ultrahigh-definition camera lens assembly with nine lenses which has an ultra-large image surface, due to the feature of compact structure of the camera lens assembly with nine lenses, an ultrathin design of a mobile phone is also ensured on the premise that the optical performance is fully improved, and higher adaptability to a market requirement and a trend of development of mobile phones to ultrathin designs is achieved.

BRIEF DESCRIPTION OF THE DRAWINGS

Detailed descriptions are made to unrestrictive implementation modes with reference to the following drawings to make other features, objectives and advantages of the disclosure more apparent.

DETAILED DESCRIPTION OF THE EMBODIMENTS

Figure 1:
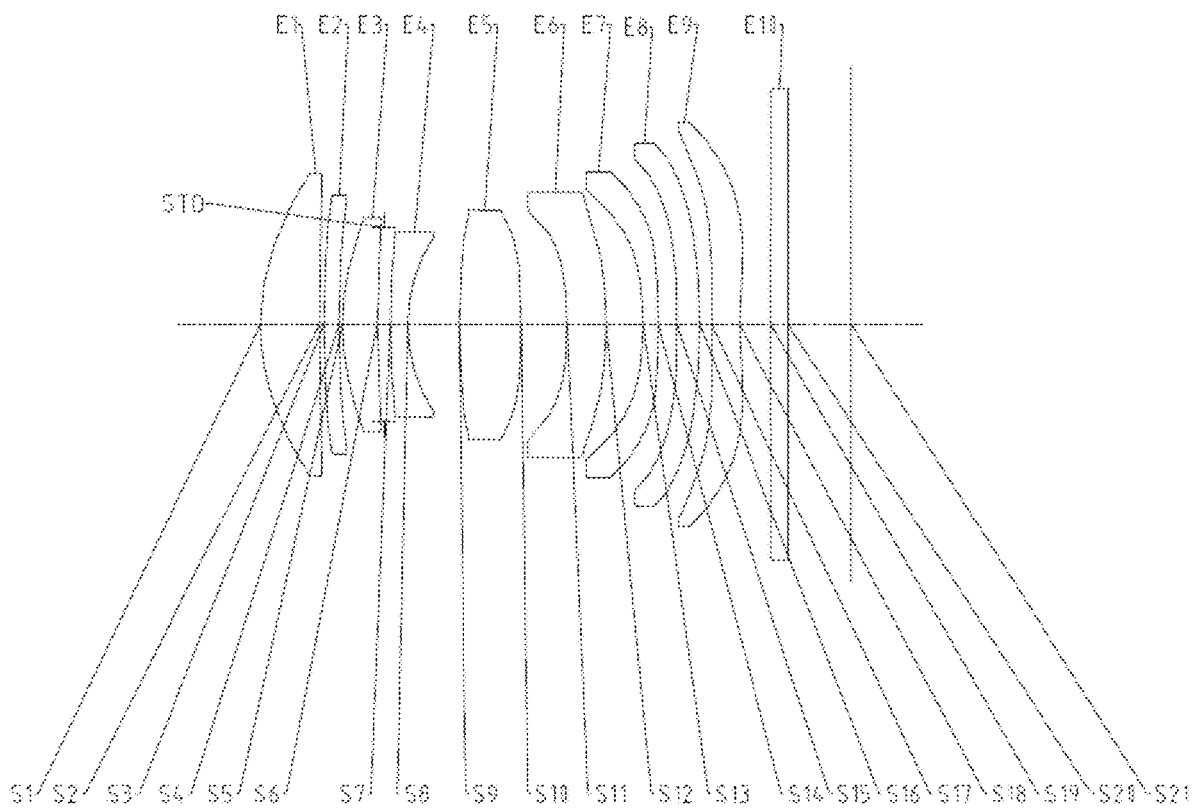
FIG. 1 shows a structural schematic diagram of a camera lens assembly according to Embodiment 1 of the disclosure.

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, the expressions of first, second, third, etc. are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or aspheric shape shown in the drawings is shown by some embodiments. That is, the spherical shape or the aspheric shape is not limited to the spherical shape or aspheric shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if a lens surface is a concave surface and a position of the concave surface is not defined, it indicates that the lens surface is a concave surface at least in the paraxial region. A surface, closest to a shot object, of each lens is called an object-side surface of the lens, and a surface, closest to an imaging surface, of each lens is called an image-side surface of the lens.

It should also be understood that terms "include", "including", "have", "contain" and/or "containing", used in the specification, represent existence of a stated feature, component and/or part but do not exclude existence or addition of one or more other features, components and parts and/or combinations thereof. In addition, expressions like "at least one in . . . " may appear after a list of listed features not to modify an individual component in the list but to modify the listed features. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by those of ordinary skill in the art of the disclosure. It should also be understood that the terms (for example, terms defined in a common dictionary) should be explained to have meanings consistent with the meanings in the context of a related art and may not be explained with ideal or excessively formal meanings, unless clearly defined like this in the disclosure.

It is to be noted that the embodiments in the disclosure and features in the embodiments may be combined without conflicts. The disclosure will be described below with reference to the drawings and in combination with the embodiments in detail.

The features, principles and other aspects of the disclosure will be described below in detail.

A camera lens assembly according to the exemplary embodiment of the disclosure may include nine lenses, sequentially including from an object side to an image side: a first lens, a second lens, a third lens, a fourth lens, a fifth lens, a sixth lens, a seventh lens, an eighth lens and a ninth lens.

In an exemplary embodiment, refractive power of each optical element of a system is controlled reasonably to balance and control a low-order aberration of the system effectively. The first lens has a positive refractive power or a negative refractive power, an object-side surface thereof is a convex surface, and the second lens has a positive refractive power or a negative refractive power, so that enlargement of the field of view is facilitated, and meanwhile, compression of an incidence angle of light at a position of a diaphragm, reduction of a pupil aberration and improvement of the imaging quality are also facilitated; the third lens has a positive refractive power, the fourth lens has a positive refractive power or a negative refractive power, so that reduction of spherical aberration and astigmatism of the system is facilitated; the fifth lens has a positive refractive power or a negative refractive power, the sixth lens has a positive refractive power or a negative refractive power, so that high imaging quality and loose processing properties of a large-aperture camera lens assembly with a compact structure are achieved; the seventh lens has a negative refractive power, the eighth lens has a positive refractive power or a negative refractive power, so that spherical aberration contributions of the two optical elements may be controlled reasonably at a reasonable level to achieve high imaging quality in an on-axis field of view; The ninth lens has a positive refractive power or a negative refractive power, so that the feature of large image surface may be achieved, and relatively high luminous flux may be achieved in an off-axis field of view. A ratio of an on-axis distance from the object-side surface of the first lens to an imaging surface of the camera lens assembly to an effective focal length of the camera lens assembly may be controlled to ensure a telephoto feature of the camera lens assembly effectively, thereby achieving the effects of zooming in on a subject, compressing the space, bokeh and the like.

In an exemplary embodiment, the camera lens assembly may satisfy a condition TTL/f<1.1, wherein TTL is an on-axis distance from an object-side surface of the first lens to an imaging surface of the camera lens assembly, and f is an effective focal length of the camera lens assembly; a ratio of TTL to f may be controlled to ensure the telephoto feature of the camera lens assembly effectively, thereby achieving the effects of zooming in on the subject, compressing the space, bokeh and the like. More specifically, TTL and f may satisfy $0.94 \leq TTL/f \leq 1.01$.

In an exemplary embodiment, the camera lens assembly may satisfy a condition 0.7<f7/f9<1.3; wherein f7 is an effective focal length of the seventh lens, and f9 is an effective focal length of the ninth lens; a ratio of the effective focal length of the seventh lens to the effective focal length of the ninth lens may be restricted to control spherical aberration contributions of the seventh lens and the ninth lens reasonably at a reasonable level to achieve high imaging quality in the on-axis field of view. More specifically, f7 and f9 may satisfy $0.72 \leq f7/f9 \leq 1.21$.

In an exemplary embodiment, the camera lens assembly may satisfy a condition 0.5<f1/f<1; wherein f1 is an effective focal length of the first lens, and f is an effective focal length of the camera lens assembly. The positive refractive power of the first lens may be controlled in a reasonable interval to ensure that the first lens achieves positive refractive power required by the camera lens assembly and a spherical aberration contribution thereof is in a reasonable and controllable range to ensure that the subsequent optical lens may correct a negative spherical aberration contribution thereof reasonably and further ensure the image quality of the camera lens assembly set in the on-axis field of view better. More specifically, f1 and f may satisfy 0.63≤f1/f≤0.74.

In an exemplary embodiment, the camera lens assembly may satisfy a condition −5<R13/f<0; wherein R13 is a curvature radius of an object-side surface of the seventh lens, and f is an effective focal length of the camera lens assembly. A ratio of the curvature radius of the object-side surface of the seventh lens to the effective focal length may be controlled to ensure that the seventh lens achieves refractive power required by the camera lens assembly and a spherical aberration contribution thereof is in a reasonable and controllable range to ensure that the subsequent optical lens may correct the spherical aberration contribution thereof reasonably and further ensure the image quality of the camera lens assembly set in the on-axis field of view better. More specifically, R13 and f may satisfy −0.44≤R13/f≤−0.38.

In an exemplary embodiment, the camera lens assembly may satisfy a condition DT92/TD<0.5; wherein DT92 is a maximum effective semi-diameter of an image-side surface of the ninth lens, and TD is an on-axis distance from the object-side surface of the first lens to an image-side surface of the ninth lens. A ratio of the maximum effective semi-diameter of the image-side surface of the ninth lens to the on-axis distance from the object-side surface of the first lens to the image-side surface of the ninth lens may be controlled to restrict a thickness and position of the ninth lens effectively to make the lens uniform in thickness, uniform in structural arrangement and convenient to form, machine and assemble. More specifically, DT92 and TD may satisfy 0.37≤DT92/TD≤0.42.

In an exemplary embodiment, the camera lens assembly may satisfy a condition 1<DT32/DT41<1.5; wherein DT32 is a maximum effective semi-diameter of an image-side surface of the third lens, and DT41 is a maximum effective semi-diameter of an object-side surface of the fourth lens. A ratio of the maximum effective semi-diameter of the image-side surface of the third lens to the maximum effective semi-diameter of the object-side surface of the fourth lens may be controlled to restrict shapes and thicknesses of the third lens and the fourth lens effectively to make the lenses uniform in thickness and convenient to form and machine. More specifically, DT32 and DT41 may satisfy 1.06≤DT32/DT41≤1.09.

In an exemplary embodiment, the camera lens assembly may satisfy a condition −0.7<R8/f4<−0.2; wherein R8 is a curvature radius of an image-side surface of the fourth lens, and f4 is an effective focal length of the fourth lens. A ratio of the curvature radius of the image-side surface of the fourth lens to the effective focal length of the fourth lens may be controlled to restrict a curvature of the fourth lens effectively and simultaneously ensure that the fourth lens achieves better a focal length contribution of the telephoto camera lens assembly, thereby achieving the effects of zooming in on the subject, compressing the space, bokeh and the like. More specifically, R8 and f4 may satisfy −0.56≤R8/f4≤−0.49.

In an exemplary embodiment, the camera lens assembly may satisfy a condition 0.15<CT5/ΣCT<0.5; wherein CT5 is a center thickness of the fifth lens, and ΣCT is a sum of respective thicknesses of the first lens to the ninth lens on the optical axis. A ratio of the center thickness of the fifth lens to the sum of the respective thicknesses of the first lens to the ninth lens on the optical axis may be controlled to control a trend of a thickness ratio of aspheric surfaces of the fifth lens to ensure that the thickness ratio subsequently falls in an interval for easy machining. More specifically, CT5/ΣCT may satisfy 0.20≤CT5/ΣCT≤0.23.

In an exemplary embodiment, the camera lens assembly may satisfy a condition 0.5<DT11/ImgH<1; wherein DT11 is a maximum effective semi-diameter of the object-side surface of the first lens, and ImgH is a half the diagonal length of an effective pixel region of the electronic photosensitive element. A ratio of the maximum effective semi-diameter of the object-side surface of the first lens to a half the diagonal length of the effective pixel region of the electronic photosensitive element may be restricted to facilitate enlargement of the field of view and also facilitate compression of the angle of incidence of the light at the position of the diaphragm, reduction of the pupil aberration and improvement of the imaging quality. More specifically, DT11 and ImgH may satisfy 0.58≤DT11/ImgH≤0.66.

In an exemplary embodiment, the camera lens assembly may satisfy a condition 2<CT6/CT7<3.5; wherein CT6 is a center thickness of the sixth lens, and CT7 is a center thickness of the seventh lens. A ratio of the center thickness of the sixth lens to the center thickness of the seventh lens may be restricted to control shapes and thickness uniformity of the sixth lens and the seventh lens effectively to make the shapes of the two lenses more complementary and ensure a smooth transition of the light. More specifically, CT6 and CT7 may satisfy 2.05≤CT6/CT7≤3.31.

In an exemplary embodiment, the camera lens assembly may satisfy a condition 1.8<CT3/ET3<3; wherein CT3 is a center thickness of the third lens, and ET3 is an edge thickness of the third lens. A ratio of the center thickness of the third lens to the edge thickness of the third lens may be controlled to make the third lens uniform in lens thickness and convenient to form and machine. More specifically, CT3 and ET3 may satisfy 2.00≤CT3/ET3≤2.78.

In an exemplary embodiment, the camera lens assembly may satisfy a condition 0.9<R11/R12<1.5; wherein R11 is a curvature radius of an object-side surface of the sixth lens, and R12 is a curvature radius of an image-side surface of the sixth lens. Numerical values of the curvature radius of the object-side surface of the sixth lens and the curvature radius of the image-side surface of the sixth lens may be controlled to control a trend of a thickness ratio of aspheric surfaces of the sixth lens well and control a coma contribution of the sixth lens in a reasonable range to prevent the image quality in the on-axis field of view and the off-axis field of view from being obviously degraded by the coma contribution. More specifically, R11 and R12 satisfy 0.90≤R11/R12≤1.19.

In an exemplary embodiment, the camera lens assembly may satisfy a condition 0.1<SAG51/CT5<0.5; wherein SAG51 is an on-axis spacing distance from an intersection point of an object-side surface of the fifth lens and the optical axis to an effective radius vertex of the object-side surface of the fifth lens, and CT5 is a center thickness of the fifth lens. A ratio of the on-axis spacing distance from the intersection point of the object-side surface of the fifth lens and the optical axis to the effective radius vertex of the object-side surface of the fifth lens to the center thickness of the fifth lens may be controlled to control an angle of incidence of a chief ray in each field of view of the system on the image surface reasonably to satisfy a Chief Ray Angle (CRA) design requirement of the optical system. More specifically, SAG51 and CT5 may satisfy 0.16≤SAG51/CT5≤0.30.

In an exemplary embodiment, the camera lens assembly may satisfy a condition 0.9<Tr9r12/Tr13r18<1.6; wherein Tr9r12 is an on-axis distance from the object-side surface of the fifth lens to the image-side surface of the sixth lens, and Tr13r8 is an on-axis distance from the object-side surface of the seventh lens to the image-side surface of the ninth lens. A ratio of the on-axis distance from the object-side surface of the fifth lens to the image-side surface of the sixth lens to the on-axis distance from the object-side surface of the seventh lens to the image-side surface of the ninth lens may be controlled in a reasonable interval range to ensure a field curvature and distortion of the system effectively, thereby achieving high imaging quality in the off-axis field of view. More specifically, Tr9r12 and Tr13r18 may satisfy 0.99≤Tr9r12/Tr13r18≤1.53.

In an exemplary embodiment, the camera lens assembly may satisfy a condition CT2/CT3<0.6; wherein CT2 is a center thickness of the second lens, and CT3 is a center thickness of the third lens. A ratio of the center thickness of the second lens to the center thickness of the third lens may be restricted to control shapes and thickness uniformity of the second lens and the third lens effectively to make the shapes of the two lenses more complementary, improve the spherical aberration and improve the imaging quality of the lens. More specifically, CT2 and CT3 may satisfy 0.36≤CT2/CT3≤0.52.

In an exemplary embodiment, the camera lens assembly may satisfy a condition 0.1<BFL/TTL<0.25; wherein BFL is an on-axis distance from the image-side surface of the ninth lens to the imaging surface of the camera lens assembly, and TTL is the on-axis distance from the object-side surface of the first lens to the imaging surface of the camera lens assembly. A ratio of the on-axis from the image-side surface of the ninth lens to the imaging surface of the camera lens assembly to the on-axis distance from the object-side surface of the first lens to the imaging surface of the camera lens assembly may be controlled to control a projection height of the light at the ninth lens effectively to further control an aperture of the ninth lens to satisfy the luminous flux of the camera lens assembly in the off-axis field of view. More specifically, BFL and TTL may satisfy 0.16≤BFL/TTL≤0.20.

In an exemplary embodiment, the camera lens assembly may satisfy a condition 2<10×(T45+T56+T67)/TTL<3; wherein T45 is an on-axis spacing distance from the fourth lens to the fifth lens, T56 is an on-axis spacing distance from the fifth lens to the sixth lens, T67 is an on-axis spacing distance from the sixth lens to the seventh lens, and TTL is the on-axis distance from an object-side surface of the first lens to an imaging surface of the camera lens assembly. A ratio of a sum of the on-axis spacing distance from the fourth lens to the fifth lens, the on-axis spacing distance from the fifth lens to the sixth lens and the on-axis spacing distance from the sixth lens to the seventh lens to the on-axis spacing distance from the object-side surface of the first lens to the imaging surface of the camera lens assembly may be controlled in a certain range to ensure structural feasibility and relatively low system sensitivity of the system effectively. More specifically, T45, T56, T67 and TTL may satisfy 2.05≤10×(T45+T56+T67)/TTL≤2.49.

In an exemplary embodiment, the camera lens assembly may satisfy 39°<FOV<48°, wherein FOV is a maximum field of view of the camera lens assembly. The maximum field of view of the camera lens assembly may be controlled to ensure an imaging range of the system with relatively high imaging quality. More specifically, FOV may satisfy 40.5°≤FOV≤47.5°.

Each technical feature in the camera lens assembly of the disclosure may be configured in a combined manner to achieve corresponding effects.

The camera lens assembly according to the embodiment of the disclosure may adopt multiple lenses, for example, the abovementioned nine. The refractive power of each optical element of the system is controlled reasonably to balance and control the low-order aberration of the system effectively. According to the camera lens assembly with a telephoto feature and a compact structure, due to the feature of compact structure of the camera lens assembly with nine lenses, an ultrathin design of a mobile phone is also ensured on the premise that the optical performance is fully improved, and higher adaptability to a market requirement and a market trend of development of mobile phones to ultrathin designs is achieved.

Specific embodiments applied to the camera lens assembly of the abovementioned embodiment will further be described below with reference to the drawings.

Embodiment 1

FIG. 1 shows a structural schematic diagram of a camera lens assembly according to Embodiment 1 of the disclosure. As shown in FIG. 1, the camera lens assembly sequentially includes from an object side surface to an image side surface, a diaphragm STO, a first lens E1, a second lens E2, a third lens E3, a fourth lens E4, a fifth lens E5, a sixth lens E6, a seventh lens E7, an eighth lens E8, a ninth lens E9, an optical filter E10 and an imaging surface S21.

The first lens E1 has a positive refractive power, an object-side surface S1 thereof is a convex surface, and an image-side surface S2 thereof is a concave surface. The second lens E2 has a negative refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a concave surface. The fourth lens E4 has a negative refractive power, an object-side surface S7 thereof is a convex surface, and an image-side surface S8 thereof is a concave surface. The fifth lens E5 has a positive refractive power, an object-side surface S9 thereof is a convex surface, and an image-side surface S10 thereof is a convex surface. The sixth lens E6 has a positive refractive power, an object-side surface S11 thereof is a convex surface, and an image-side surface S12 thereof is a concave surface. The seventh lens E7 has a negative refractive power, an object-side surface S13 thereof is a concave surface, and an image-side surface S14 thereof is a convex surface. The eighth lens E8 has a positive refractive power, an object-side surface S15 thereof is a convex surface, and an image-side surface S16 thereof is a convex surface. The ninth lens E9 has a negative refractive power, an object-side surface S17 thereof is a convex surface, and an image-side surface S18 thereof is a convex surface. The optical filter E10 has an object-side surface S19 and an image-side surface S20.

Light from an object sequentially penetrates through each of the surfaces S1 to S20 and is finally imaged on the imaging surface S21.

Table 1 shows basic parameters of the camera lens assembly of Embodiment 1, wherein the units of the curvature radius, the thickness and the focal length are all millimeters.

TABLE 1

| Surface number | Surface type | Curvature radius | Thickness | Focal length | Refractive index | Abbe number | Conic coefficient |
|---|---|---|---|---|---|---|---|
| OBJ | Spherical | Infinite | Infinite | | | | |
| S1 | Aspheric | 4.9780 | 1.2984 | 9.60 | 1.55 | 56.1 | −0.2510 |
| S2 | Aspheric | 89.5814 | 0.0978 | | | | −98.6551 |
| S3 | Aspheric | 32.5189 | 0.3325 | −499.99 | 1.65 | 23.5 | 98.4573 |
| S4 | Aspheric | 29.4201 | 0.0789 | | | | 97.9819 |
| S5 | Aspheric | 5.8123 | 0.7583 | 15.36 | 1.55 | 56.1 | 0.1924 |
| S6 | Aspheric | 18.0767 | 0.1511 | | | | 10.0831 |
| STO | Spherical | Infinite | 0.1397 | | | | |
| S7 | Aspheric | 16.6745 | 0.3845 | −6.94 | 1.66 | 21.5 | −59.2954 |
| S8 | Aspheric | 3.5464 | 1.1309 | | | | −0.1086 |
| S9 | Aspheric | 14.4013 | 1.3733 | 14.83 | 1.65 | 23.5 | −12.5903 |
| S10 | Aspheric | −27.3583 | 1.0065 | | | | 96.4236 |
| S11 | Aspheric | −10.8626 | 0.8606 | 282.54 | 1.66 | 21.5 | 15.2053 |
| S12 | Aspheric | −10.5837 | 0.8167 | | | | 1.9185 |
| S13 | Aspheric | −5.6997 | 0.3260 | −13.72 | 1.55 | 56.1 | 1.6734 |
| S14 | Aspheric | −24.3474 | 0.4162 | | | | 47.0492 |
| S15 | Aspheric | 66.9336 | 0.5000 | 26.49 | 1.55 | 56.1 | −99.0000 |
| S16 | Aspheric | −18.4026 | 0.2645 | | | | 18.5953 |
| S17 | Aspheric | 42.4871 | 0.6109 | −16.99 | 1.55 | 56.1 | −99.0000 |
| S18 | Aspheric | 7.5755 | 0.6959 | | | | −41.8901 |
| S19 | Spherical | Infinite | 0.3812 | | 1.52 | 64.2 | |
| S20 | Spherical | Infinite | 1.3900 | | | | |
| S21 | Spherical | Infinite | | | | | |

In Embodiment 1, a value of a total effective focal length f of the camera lens assembly is 13.01 mm, TTL is an on-axis distance from an object-side surface of the first lens to an imaging surface of the camera lens assembly, and a value of TTL is 13.14 mm, ImgH is a half the diagonal length of an effective pixel area of the electronic photosensitive element, and a value of ImgH is 5.70 mm, and a value of a half maximum field of view FOV is 47.5°.

In Embodiment 1, TTL and an effective focal length f of the camera lens assembly satisfy a relational expression TTL/f=1.01, so that TTL/f<1.1 is satisfied.

In Embodiment 1, an effective focal length f7 of the seventh lens and an effective focal length f9 of the ninth lens satisfy a relational expression f7/f9=0.81, so that 0.7<f7/f9<1.3 is satisfied.

In Embodiment 1, an effective focal length f1 of the first lens and the effective focal length f of the camera lens assembly satisfy a relational expression f1/f=0.74, so that 0.5<f1/f<1 is satisfied.

In Embodiment 1, a curvature radius R13 of the object-side surface of the seventh lens and the effective focal length f of the camera lens assembly satisfy a relational expression R13/f=−0.44, so that −5<R13/f<0 is satisfied.

In Embodiment 1, a maximum effective semi-diameter DT92 of the image-side surface of the ninth lens and an on-axis distance TD from the object-side surface of the first lens to the image-side surface of the ninth lens satisfy a relational expression DT92/TD=0.42, so that DT92/TD<0.5 is satisfied.

In Embodiment 1, a maximum effective semi-diameter DT32 of the image-side surface of the third lens and a maximum effective semi-diameter DT41 of the object-side surface of the fourth lens satisfy a relational expression DT32/DT41=1.07, so that 1<DT32/DT41<1.5 is satisfied.

In Embodiment 1, a curvature radius R8 of the image-side surface of the fourth lens and an effective focal length f4 of the fourth lens satisfy a relational expression R8/f4=−0.51, so that −0.7<R8/f4<−0.2 is satisfied.

In Embodiment 1, a center thickness CT5 of the fifth lens and a sum ΣCT of respective thicknesses of the first lens to the ninth lens on an optical axis satisfy a relational expression CT5/ΣCT=0.21, so that 0.15<CT5/ΣCT<0.5 is satisfied.

In Embodiment 1, ImgH and a maximum effective semi-diameter DT11 of the object-side surface of the first lens satisfy a relational expression DT11/ImgH=0.58, so that 0.5<DT11/ImgH<1 is satisfied.

In Embodiment 1, a center thickness CT6 of the sixth lens and a center thickness CT7 of the seventh lens satisfy a relational expression CT6/CT7=2.64, so that 2<CT6/CT7<3.5 is satisfied.

In Embodiment 1, a center thickness CT3 of the third lens and an edge thickness ET3 of the third lens satisfy a relational expression CT3/ET3=2.00, so that 1.8<CT3/ET3<3 is satisfied.

In Embodiment 1, a curvature radius R11 of the object-side surface of the sixth lens and a curvature radius R12 of the image-side surface of the sixth lens satisfy a relational expression R11/R12=1.03, so that 0.9<R11/R12<1.5 is satisfied.

In Embodiment 1, SAG51 is an on-axis spacing distance from an intersection point of an object-side surface of the fifth lens and the optical axis to an effective radius vertex of the object-side surface of the fifth lens, SAG51 and a center thickness CT5 of the fifth lens satisfy a relational expression SAG51/CT5=0.16, so that 0.1<SAG51/CT5<0.5 is satisfied.

In Embodiment 1, an on-axis distance Tr9r12 from the object-side surface of the fifth lens to the image-side surface of the sixth lens and an on-axis distance Tr13r18 from the object-side surface of the seventh lens to the image-side surface of the ninth lens satisfy a relational expression Tr9r12/Tr13r18=1.53, so that 0.9<Tr9r12/Tr13r18<1.6 is satisfied.

In Embodiment 1, a center thickness CT2 of the second lens and the center thickness CT3 of the third lens satisfy a relational expression CT2/CT3=0.44, so that CT2/CT3<0.6 is satisfied.

In Embodiment 1, BFL is an on-axis distance from an image-side surface of the ninth lens to an imaging surface of the camera lens assembly, BFL and TTL satisfy a relational expression BFL/TTL=0.19, so that 0.1<BFL/TTL<0.25 is satisfied.

In Embodiment 1, TTL, an on-axis spacing distance T45 from the fourth lens to the fifth lens, an on-axis spacing distance T56 from the fifth lens to the sixth lens, an on-axis spacing distance T67 from the sixth lens to the seventh lens satisfy a relational expression 10×(T45+T56+T67)/TTL=2.25, so that 2<10×(T45+T56+T67)/TTL<3 is satisfied.

In Embodiment 1, FOV is a maximum field of view of the camera lens assembly, FOV is 47.5°, so that 39°<FOV<48° is satisfied.

In Embodiment 1, both the object-side surface and the image-side surface of any one of the first lens E1 to the ninth lens E9 are all aspheric surfaces, and the surface type x of each aspheric lens may be defined through, but not limited to, the following aspheric surface formula:

$$x = \frac{ch^2}{1+\sqrt{1-(k+1)c^2h^2}} + \sum A_i h^i, \quad (1)$$

wherein x is a vector height of a distance between the aspheric surface and a vertex of the aspheric surface when the aspheric surface is located at a position with the height h along the optical axis direction, c=1/R (namely, the paraxial curvature c is the reciprocal of the curvature radius R in Table 1 above); k is a conic coefficient; and Ai is a correction coefficient of the i-th order of the aspheric surface.

The following Table 2 shows higher-order coefficients A4, A6, A8, A10, A12, A14, A16 and A18 applied to each of the aspheric mirror surfaces S1-S18 of the aspheric lenses in Embodiment 1 of the disclosure.

TABLE 2

| Surface number | A4 | A6 | A8 | A10 | A12 | A14 | A16 | A18 |
|---|---|---|---|---|---|---|---|---|
| S1 | −8.0030E−04 | −6.8573E−05 | 7.0905E−06 | −3.1090E−06 | 8.6377E−07 | −1.2924E−07 | 1.0106E−08 | −3.0433E−10 |
| S2 | 3.3265E−03 | −3.0074E−03 | 1.0177E−03 | −1.8806E−04 | 2.0959E−05 | −1.4465E−06 | 6.0078E−08 | −1.1957E−09 |
| S3 | 5.7642E−03 | −4.1149E−03 | 1.3310E−03 | −2.6262E−04 | 3.9949E−05 | −4.7958E−06 | 3.5609E−07 | −1.1089E−08 |
| S4 | 1.0207E−03 | −4.5407E−04 | −2.0520E−04 | 1.2529E−04 | −1.6498E−05 | −6.8841E−07 | 2.6795E−07 | −1.3599E−08 |
| S5 | −1.6052E−03 | 1.4077E−03 | −6.6645E−04 | 4.6956E−05 | 5.4308E−05 | −1.8788E−05 | 2.4275E−06 | −1.1483E−07 |
| S6 | 3.7510E−04 | 5.7016E−04 | −9.4491E−04 | 2.1098E−04 | 2.0749E−05 | −1.7001E−05 | 2.8553E−06 | −1.6751E−07 |
| S7 | −1.3374E−03 | 2.6288E−03 | −2.2143E−03 | 1.0658E−03 | −3.1177E−04 | 5.7054E−05 | −6.0017E−06 | 2.7214E−07 |
| S8 | −4.3848E−03 | 3.2113E−03 | −1.7577E−03 | 9.0221E−04 | −2.8820E−04 | 5.5703E−05 | −5.7313E−06 | 2.1611E−07 |
| S9 | −1.3747E−03 | 1.2861E−05 | 3.2853E−04 | −2.3103E−04 | 8.8875E−05 | −1.9144E−05 | 2.1913E−06 | −1.0067E−07 |
| S10 | −7.1409E−03 | 1.5191E−04 | −1.6619E−04 | 9.8330E−05 | −4.2315E−05 | 1.0113E−05 | −1.2471E−06 | 6.4423E−08 |
| S11 | −9.5023E−03 | −2.2262E−03 | 1.3343E−03 | −4.7075E−04 | 1.0632E−04 | −1.6703E−05 | 1.5987E−06 | −6.0978E−08 |
| S12 | −4.1396E−04 | −3.7627E−03 | 1.7002E−03 | −4.0940E−04 | 6.3704E−05 | −6.5558E−06 | 4.0528E−07 | −1.0859E−08 |
| S13 | 2.2319E−02 | −1.5022E−02 | 4.2800E−03 | −8.0756E−04 | 1.0574E−04 | −8.8951E−06 | 4.0555E−07 | −6.7499E−09 |
| S14 | 3.5335E−03 | −3.7355E−03 | 6.6171E−04 | −7.1122E−05 | 4.4872E−06 | −5.6345E−08 | −1.0095E−08 | 4.1044E−10 |
| S15 | −3.0056E−02 | 1.1332E−02 | −2.8152E−03 | 4.5506E−04 | −4.8246E−05 | 3.1988E−06 | −1.1926E−07 | 1.8952E−09 |
| S16 | −5.7739E−03 | 2.4623E−03 | −6.9649E−04 | 1.2143E−04 | −1.3092E−05 | 8.3779E−07 | −2.8954E−08 | 4.1456E−10 |
| S17 | −8.9831E−03 | 1.9856E−03 | −3.9095E−04 | 4.5253E−05 | −3.1554E−06 | 1.3665E−07 | −3.4551E−09 | 3.8877E−11 |
| S18 | −1.3461E−02 | 2.3199E−03 | −3.2437E−04 | 2.9008E−05 | −1.7051E−06 | 6.5735E−08 | −1.5104E−09 | 1.5414E−11 |

Figure 2:
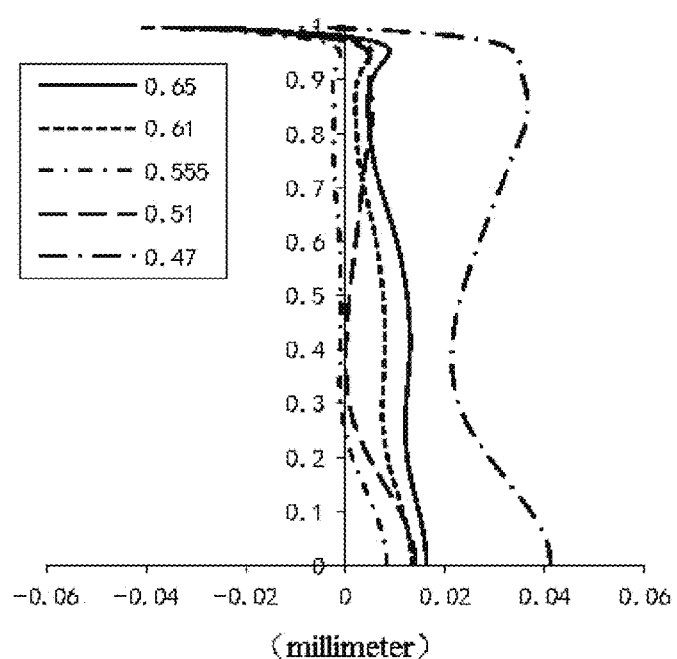
FIGS. 2-5 show a longitudinal aberration curve, an astigmatism curve, a distortion curve and a relative illumination curve of a camera lens assembly according to Embodiment 1 of the disclosure.
Figure 3:
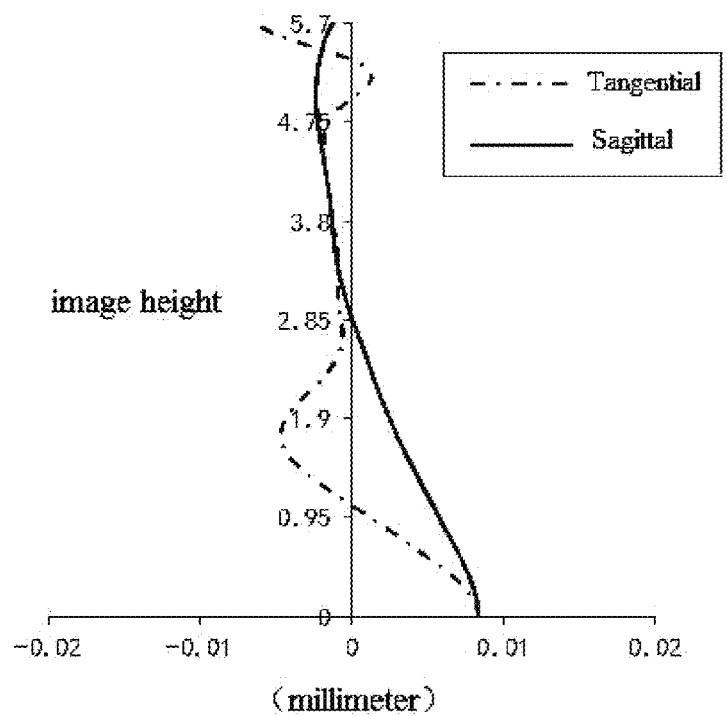
Figure 4:
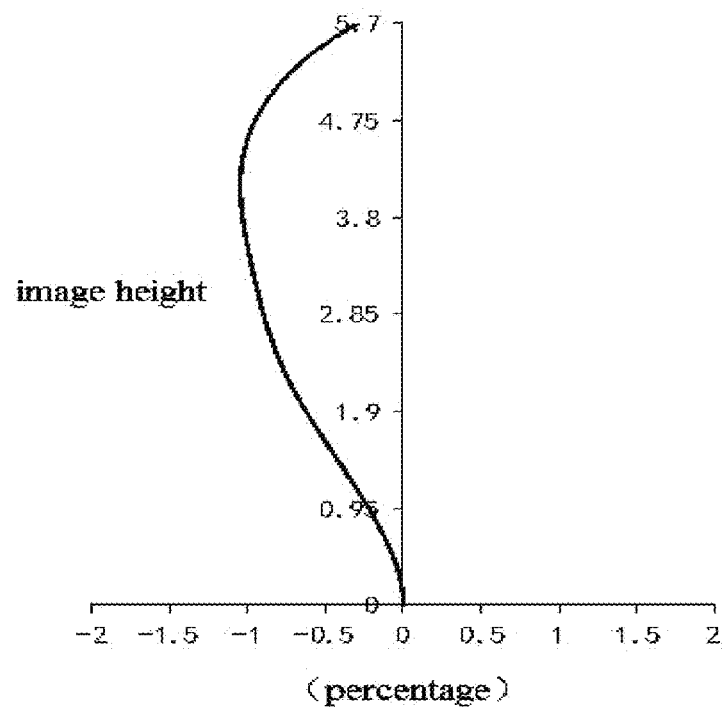
Figure 5:
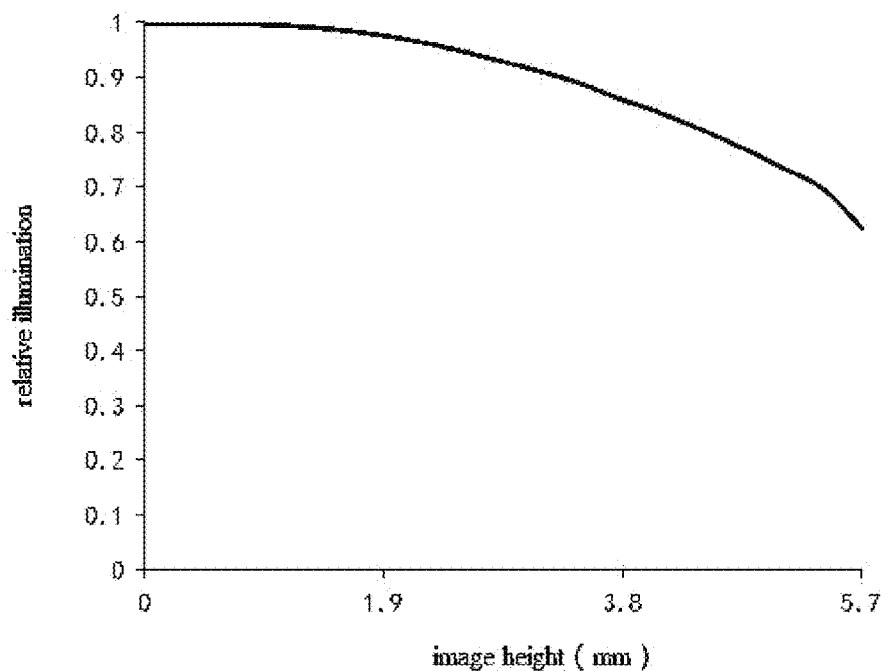

FIG. 2 shows a longitudinal aberration curve of the camera lens assembly according to Embodiment 1 to represent deviation of a convergence focal point after light with different wavelengths passes through the lens. FIG. 3 shows an astigmatism curve of the camera lens assembly according to Embodiment 1 to represent a curvature of tangential image surface and a curvature of sagittal image surface. FIG. 4 shows a distortion curve of the camera lens assembly according to Embodiment 1 to represent distortion values corresponding to different image heights. FIG. 5 shows a relative illumination curve of the camera lens assembly according to Embodiment 1 to represent relative illuminations corresponding to different image heights on the imaging surface after the light passes through the lens. According to FIGS. 2-5, it can be seen that the camera lens assembly provided in Embodiment 1 may achieve good imaging quality.

Embodiment 2

Figure 6:
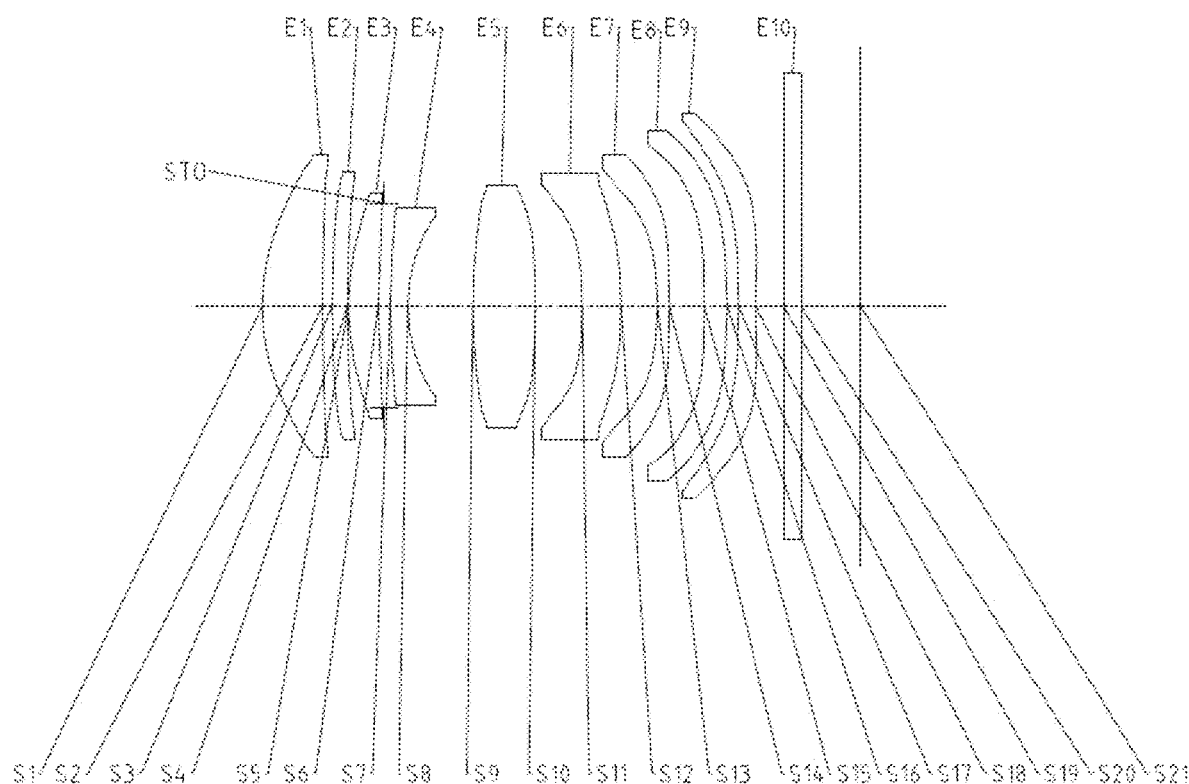
FIG. 6 shows a structural schematic diagram of a camera lens assembly according to Embodiment 2 of the disclosure.

FIG. 6 shows a structural schematic diagram of a camera lens assembly according to Embodiment 2 of the disclosure. As shown in FIG. 6, the camera lens assembly sequentially includes from an object-side surface to an image-side surface, a diaphragm STO, a first lens E1, a second lens E2, a third lens E3, a fourth lens E4, a fifth lens E5, a sixth lens E6, a seventh lens E7, an eighth lens E8, a ninth lens E9, an optical filter E10 and an imaging surface S21.

The first lens E1 has a positive refractive power, an object-side surface S1 thereof is a convex surface, and an image-side surface S2 thereof is a concave surface. The second lens E2 has a positive refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a concave surface. The fourth lens E4 has a negative refractive power, an object-side surface S7 thereof is a convex surface, and an image-side surface S8 thereof is a concave surface. The fifth lens E5 has a positive refractive power, an object-side surface S9 thereof is a convex surface, and an image-side surface S10 thereof is a convex surface. The sixth lens E6 has a positive refractive power, an object-side surface S11 thereof is a convex surface, and an image-side surface S12 thereof is a concave surface. The seventh lens E7 has a negative refractive power, an object-side surface S13 thereof is a concave surface, and an image-side surface S14 thereof is a convex surface. The eighth lens E8 has a positive refractive power, an object-side surface S15 thereof is a convex surface, and an image-side surface S16 thereof is a convex surface. The ninth lens E9 has a negative refractive power, an object-side surface S17 thereof is a convex surface, and an image-side surface S18 thereof is a convex surface. The optical filter E10 has an object-side surface S19 and an image-side surface S20. Light from an object sequentially penetrates through each of the surfaces S1 to S20 and is finally imaged on the imaging surface S21.

In Embodiment 2 of the disclosure, explanations about parameters of each relational expression are the same as those in Embodiment 1, and numerical values of each relational expression are listed in the following Table 3.

TABLE 3

| Embodiment 2 | | | |
|---|---|---|---|
| TTL (mm) | 13.22 | ImgH (mm) | 5.70 |
| FOV(°) | 44.8 | TTL/f | 0.97 |
| f7/f9 | 0.96 | f1/f | 0.71 |
| R13/f | −0.42 | DT92/TD | 0.39 |
| DT32/DT41 | 1.06 | R8/f4 | −0.51 |
| CT5/ΣCT | 0.23 | DT11/ImgH | 0.59 |
| CT6/CT7 | 3.31 | CT3/ET3 | 2.40 |
| R11/R12 | 1.13 | SAG51/CT5 | 0.23 |
| Tr9r12/Tr13r18 | 1.50 | CT2/CT3 | 0.52 |
| BFL/TTL | 0.18 | 10 × (T45 + T56 + T67)/TTL | 2.49 |

Table 4 shows basic parameters of the camera lens assembly of Embodiment 2 of the disclosure, wherein the units of the curvature radius, the thickness and the focal length are all millimeters.

TABLE 4

| Surface number | Surface type | Curvature radius | Thickness | Focal length | Refractive index | Abbe number | Conic coefficient |
|---|---|---|---|---|---|---|---|
| OBJ | Spherical | Infinite | Infinite | | | | |
| S1 | Aspheric | 4.7795 | 1.3312 | 9.66 | 1.55 | 56.1 | −0.3150 |
| S2 | Aspheric | 46.0776 | 0.2045 | | | | −98.6551 |
| S3 | Aspheric | 30.0789 | 0.3410 | 399.99 | 1.65 | 23.5 | 98.4573 |
| S4 | Aspheric | 33.9001 | 0.0200 | | | | 97.9819 |
| S5 | Aspheric | 5.9649 | 0.6587 | 16.59 | 1.55 | 56.1 | 0.0791 |
| S6 | Aspheric | 16.7799 | 0.1245 | | | | 10.0831 |
| STO | Spherical | Infinite | 0.1397 | | | | |
| S7 | Aspheric | 16.5458 | 0.3845 | −7.11 | 1.66 | 21.5 | −59.2954 |
| S8 | Aspheric | 3.6060 | 1.4535 | | | | −0.0584 |
| S9 | Aspheric | 13.6058 | 1.3733 | 16.25 | 1.65 | 23.5 | −9.1150 |
| S10 | Aspheric | −43.7604 | 1.0307 | | | | 96.4236 |
| S11 | Aspheric | −11.9255 | 0.8606 | 112.02 | 1.66 | 21.5 | 15.2619 |
| S12 | Aspheric | −10.5546 | 0.8036 | | | | 2.3982 |
| S13 | Aspheric | −5.7381 | 0.2602 | −13.62 | 1.55 | 56.1 | 1.5802 |
| S14 | Aspheric | −25.5676 | 0.7694 | | | | 47.0492 |
| S15 | Aspheric | 62.7022 | 0.5013 | 25.56 | 1.55 | 56.1 | −98.0445 |
| S16 | Aspheric | −17.8964 | 0.2598 | | | | 18.8547 |
| S17 | Aspheric | −35.9406 | 0.3842 | −14.22 | 1.55 | 56.1 | 47.1475 |
| S18 | Aspheric | 9.9428 | 0.6214 | | | | −99.0000 |
| S19 | Spherical | Infinite | 0.3812 | | 1.52 | 64.2 | |
| S20 | Spherical | Infinite | 1.3154 | | | | |
| S21 | Spherical | Infinite | | | | | |

The following Table 5 shows higher-order coefficients A4, A6, A8, A10, A12, A14, A16 and A18 applied to each of the aspheric mirror surfaces S1-S18 of the aspheric lenses in Embodiment 2 of the disclosure. A surface type of each aspheric mirror surface may be defined by the formula (1) given in Embodiment 1.

negative refractive power, an object-side surface S7 thereof is a convex surface, and an image-side surface S8 thereof is a concave surface. The fifth lens E5 has a positive refractive power, an object-side surface S9 thereof is a convex surface, and an image-side surface S10 thereof is a convex surface. The sixth lens E6 has a negative refractive power, an

TABLE 5

| Surface number | A4 | A6 | A8 | A10 | A12 | A14 | A16 | A18 |
|---|---|---|---|---|---|---|---|---|
| S1 | −6.8583E−04 | 2.7275E−05 | −3.4915E−05 | −3.5479E−07 | 1.9881E−06 | −3.7518E−07 | 2.8702E−08 | −7.9914E−10 |
| S2 | 7.4481E−04 | 2.0032E−04 | −7.3153E−04 | 3.1228E−04 | −5.9987E−05 | 6.0315E−06 | −3.0823E−07 | 6.3191E−09 |
| S3 | 4.3563E−03 | −2.1634E−03 | 4.9048E−04 | −1.4803E−04 | 5.3999E−05 | −1.0684E−05 | 9.8037E−07 | −3.3697E−08 |
| S4 | 1.5101E−03 | −1.8852E−03 | 1.3456E−03 | −6.5776E−04 | 1.9293E−04 | −3.1422E−05 | 2.6102E−06 | −8.6020E−08 |
| S5 | −2.5375E−03 | 2.2609E−03 | −1.4112E−03 | 4.6858E−04 | −8.5517E−05 | 7.7052E−06 | −2.1403E−07 | −8.1054E−09 |
| S6 | −1.6303E−03 | 7.4428E−03 | −8.9487E−03 | 4.9559E−03 | −1.5681E−03 | 2.8804E−04 | −2.8562E−05 | 1.1812E−06 |
| S7 | −3.6151E−03 | 9.3896E−03 | −1.0626E−02 | 6.4613E−03 | −2.2844E−03 | 4.7148E−04 | −5.2620E−05 | 2.4515E−06 |
| S8 | −5.0401E−03 | 7.0014E−03 | −7.0697E−03 | 4.7962E−03 | −1.9377E−03 | 4.5955E−04 | −5.8778E−05 | 3.1161E−06 |
| S9 | −9.0298E−04 | −6.7318E−05 | 3.5351E−04 | −2.1747E−04 | 7.2235E−05 | −1.3390E−05 | 1.3164E−06 | −5.2287E−08 |
| S10 | −7.3188E−03 | 1.5878E−04 | −8.6377E−05 | 5.0582E−05 | −2.5774E−05 | 6.5640E−06 | −8.0415E−07 | 3.9551E−08 |
| S11 | −1.0375E−02 | −2.4478E−03 | 1.3945E−03 | −3.8565E−04 | 5.5717E−05 | −4.2117E−06 | 1.7798E−07 | −2.4209E−09 |
| S12 | −2.6906E−04 | −4.3463E−03 | 1.8877E−03 | −4.1930E−04 | 5.5690E−05 | −4.3678E−06 | 1.7789E−07 | −2.1169E−09 |
| S13 | 2.3208E−02 | −1.5900E−02 | 4.7107E−03 | −9.3908E−04 | 1.3187E−04 | −1.2052E−05 | 6.1162E−07 | −1.2141E−08 |
| S14 | 7.5928E−03 | −6.5440E−03 | 1.6686E−03 | −3.0500E−04 | 4.0292E−05 | −3.4428E−06 | 1.6612E−07 | −3.4108E−09 |
| S15 | −2.8628E−02 | 8.8463E−03 | −1.9875E−03 | 2.8329E−04 | −2.6338E−05 | 1.5887E−06 | −5.8564E−08 | 1.0146E−09 |
| S16 | −6.5024E−03 | 2.5939E−03 | −8.3588E−04 | 1.3758E−04 | −1.2698E−05 | 6.7089E−07 | −1.9100E−08 | 2.2910E−10 |
| S17 | −1.3867E−02 | 5.1177E−03 | −1.2664E−03 | 1.7307E−04 | −1.4021E−05 | 6.8414E−07 | −1.8710E−08 | 2.2035E−10 |
| S18 | −2.1528E−02 | 5.0665E−03 | −8.6203E−04 | 9.1878E−05 | −6.2526E−06 | 2.6689E−07 | −6.5266E−09 | 6.9532E−11 |

Figure 7:
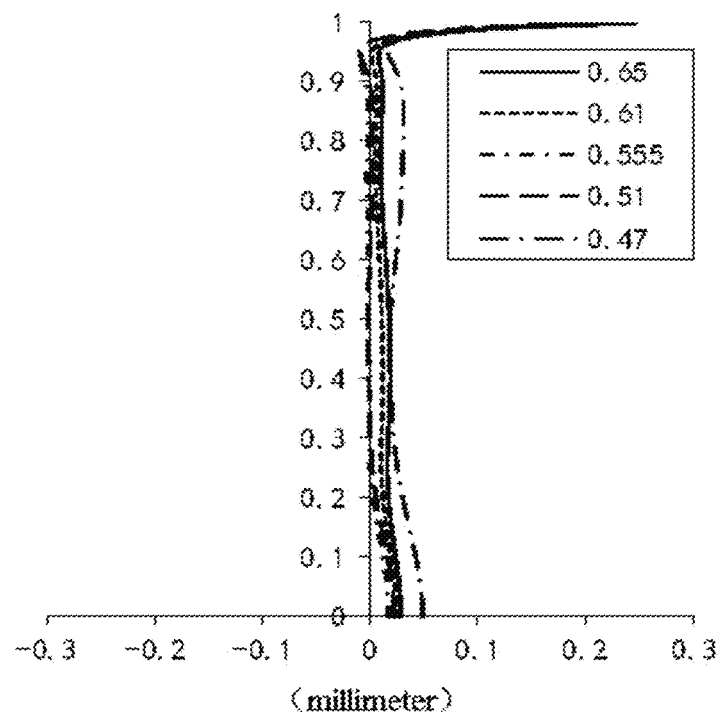
FIGS. 7-10 show a longitudinal aberration curve, an astigmatism curve, a distortion curve and a relative illumination curve of a camera lens assembly according to Embodiment 2 of the disclosure.
Figure 8:
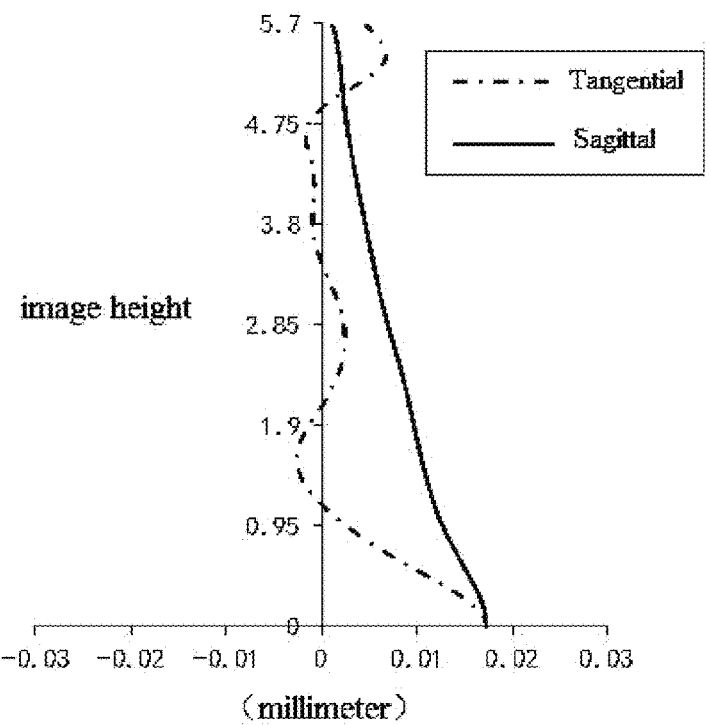
Figure 9:
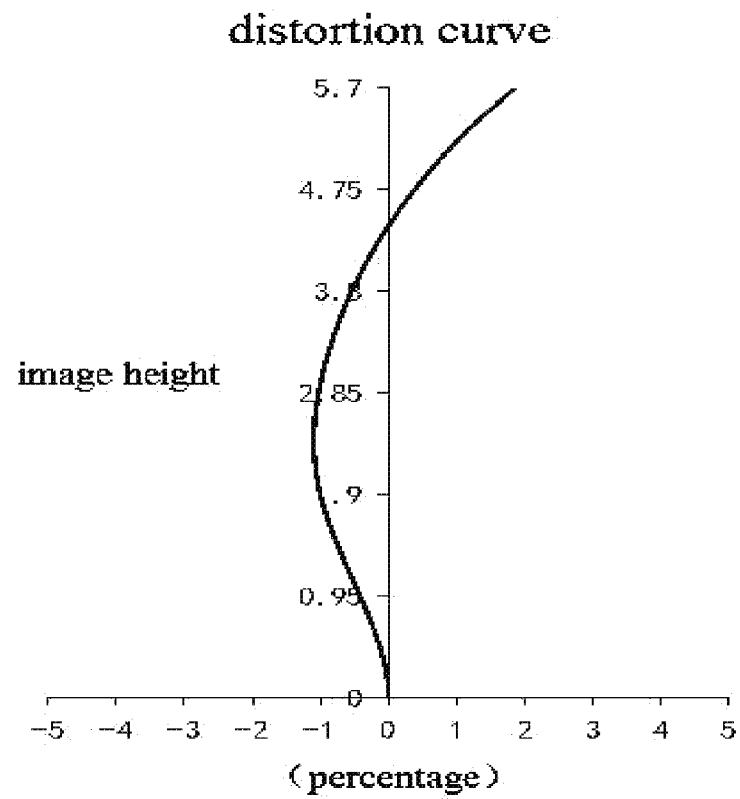
Figure 10:
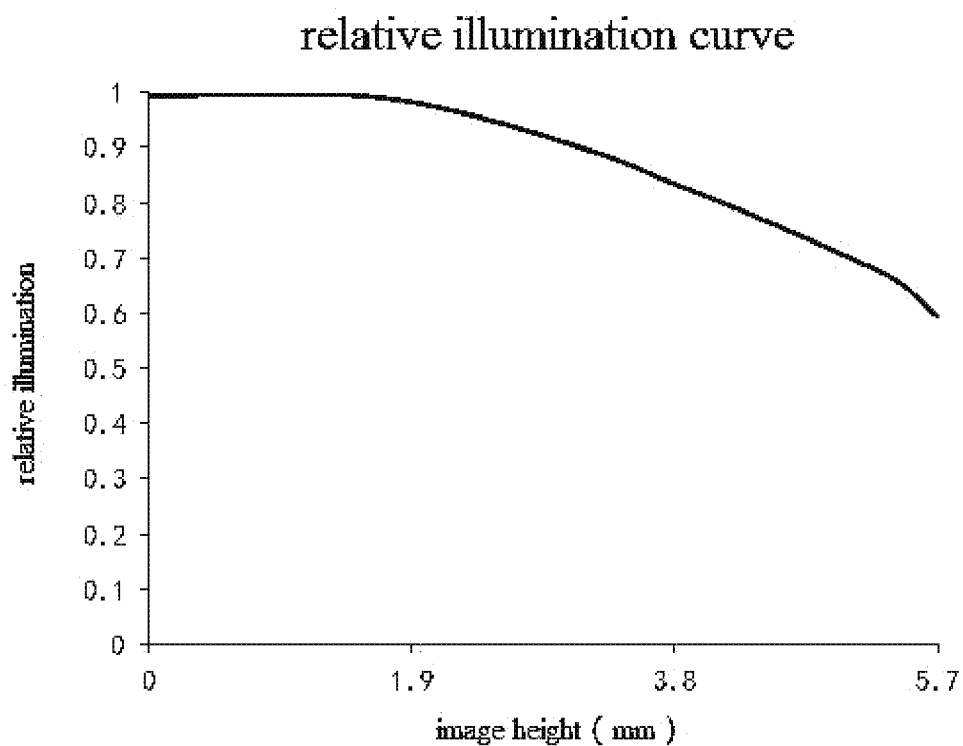

FIG. 7 shows a longitudinal aberration curve of the camera lens assembly according to Embodiment 2 of the disclosure to represent deviation of a convergence focal point after light with different wavelengths passes through the lens. FIG. 8 shows an astigmatism curve of the camera lens assembly according to Embodiment 2 of the disclosure to represent a curvature of tangential image surface and a curvature of sagittal image surface. FIG. 9 shows a distortion curve of the camera lens assembly according to Embodiment 2 of the disclosure to represent distortion values corresponding to different image heights. FIG. 10 shows a relative illumination curve of the camera lens assembly according to Embodiment 2 of the disclosure to represent relative illuminations corresponding to different image heights on the imaging surface after the light passes through the lens. According to FIGS. 7-10, it can be seen that the camera lens assembly provided in Embodiment 2 of the disclosure may achieve good imaging quality.

Embodiment 3

Figure 11:
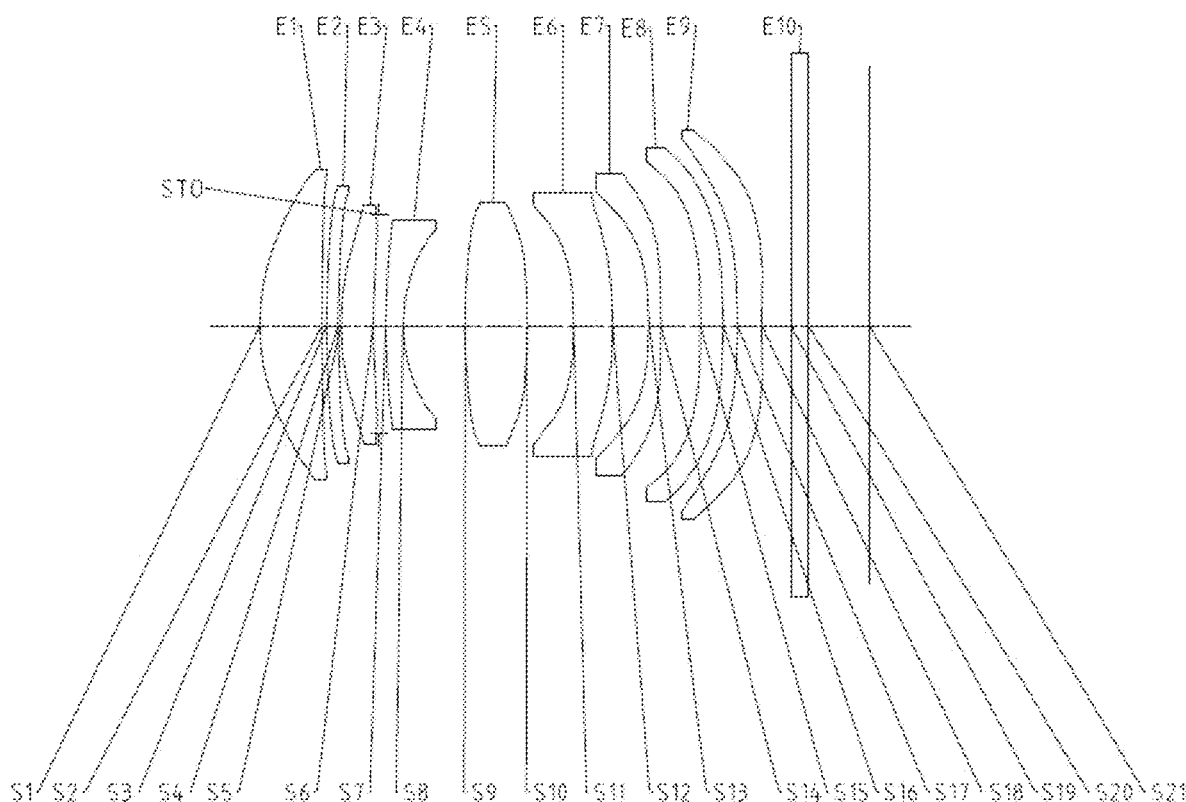
FIG. 11 shows a structural schematic diagram of a camera lens assembly according to Embodiment 3 of the disclosure.

FIG. 11 shows a structural schematic diagram of a camera lens assembly according to Embodiment 3 of the disclosure. As shown in FIG. 11, the camera lens assembly sequentially includes from an object-side surface to an image-side surface, a diaphragm STO, a first lens E1, a second lens E2, a third lens E3, a fourth lens E4, a fifth lens E5, a sixth lens E6, a seventh lens E7, an eighth lens E8, a ninth lens E9, an optical filter E10 and an imaging surface S21.

The first lens E1 has a positive refractive power, an object-side surface S1 thereof is a convex surface, and an image-side surface S2 thereof is a concave surface. The second lens E2 has a negative refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a concave surface. The fourth lens E4 has a object-side surface S11 thereof is a convex surface, and an image-side surface S12 thereof is a concave surface. The seventh lens E7 has a negative refractive power, an object-side surface S13 thereof is a concave surface, and an image-side surface S14 thereof is a convex surface. The eighth lens E8 has a positive refractive power, an object-side surface S15 thereof is a convex surface, and an image-side surface S16 thereof is a convex surface. The ninth lens E9 has a negative refractive power, an object-side surface S17 thereof is a concave surface, and an image-side surface S18 thereof is a concave surface. The optical filter E10 has an object-side surface S18 and an image-side surface S20. Light from an object sequentially penetrates through each of the surfaces S1 to S20 and is finally imaged on the imaging surface S21.

In Embodiment 3 of the disclosure, explanations about parameters of each relational expression are the same as those in Embodiment 1, and numerical values of each relational expression are listed in the following Table 6.

TABLE 6

| Embodiment 3 | | | |
|---|---|---|---|
| TTL (mm) | 13.47 | ImgH (mm) | 5.70 |
| FOV(°) | 43.8 | TTL/f | 0.94 |
| f7/f9 | 1.21 | f1/f | 0.67 |
| R13/f | −0.43 | DT92/TD | 0.39 |
| DT32/DT41 | 1.09 | R8/f4 | −0.50 |
| CT5/ΣCT | 0.22 | DT11/ImgH | 0.60 |
| CT6/CT7 | 3.31 | CT3/ET3 | 2.74 |
| R11/R12 | 0.93 | SAG51/CT5 | 0.24 |
| Tr9r12/Tr13r18 | 1.31 | CT2/CT3 | 0.36 |
| BFL/TTL | 0.18 | 10 × (T45 + T56 + T67)/TTL | 2.38 |

Table 7 shows basic parameters of the camera lens assembly of Embodiment 3 of the disclosure, wherein the units of the curvature radius, the thickness and the focal length are all millimeters.

TABLE 7

| Surface number | Surface type | Curvature radius | Thickness | Focal length | Refractive index | Abbe number | Conic coefficient |
|---|---|---|---|---|---|---|---|
| OBJ | Spherical | Infinite | Infinite | | | | |
| S1 | Aspheric | 4.8133 | 1.3642 | 9.60 | 1.55 | 56.1 | -0.2651 |
| S2 | Aspheric | 53.2357 | 0.1033 | | | | -98.6551 |
| S3 | Aspheric | 31.8547 | 0.2601 | -895.95 | 1.65 | 23.5 | 98.4573 |
| S4 | Aspheric | 30.0929 | 0.0583 | | | | 97.9819 |
| S5 | Aspheric | 5.9585 | 0.7126 | 16.05 | 1.55 | 56.1 | 0.1423 |
| S6 | Aspheric | 17.8311 | 0.1375 | | | | 10.0831 |
| STO | Spherical | Infinite | 0.1397 | | | | |
| S7 | Aspheric | 15.5796 | 0.3845 | -7.08 | 1.66 | 21.5 | -59.2954 |
| S8 | Aspheric | 3.5462 | 1.3730 | | | | -0.0685 |
| S9 | Aspheric | 14.3627 | 1.3733 | 15.62 | 1.65 | 23.5 | -8.3978 |
| S10 | Aspheric | -32.4463 | 1.0244 | | | | 96.4236 |
| S11 | Aspheric | -11.4796 | 0.8606 | -447.75 | 1.66 | 21.5 | 15.0002 |
| S12 | Aspheric | -12.3011 | 0.8080 | | | | 3.0181 |
| S13 | Aspheric | -6.1858 | 0.2600 | -14.94 | 1.55 | 56.1 | 1.7823 |
| S14 | Aspheric | -26.0077 | 0.8702 | | | | 47.0492 |
| S15 | Aspheric | 60.1096 | 0.5000 | 25.45 | 1.55 | 56.1 | -99.0000 |
| S16 | Aspheric | -18.0191 | 0.3175 | | | | 18.7344 |
| S17 | Aspheric | -26.7210 | 0.5427 | -12.31 | 1.55 | 56.1 | 12.4721 |
| S18 | Aspheric | 9.0409 | 0.6512 | | | | -99.0000 |
| S19 | Spherical | Infinite | 0.3812 | | 1.52 | 64.2 | 0.0000 |
| S20 | Spherical | Infinite | 1.3452 | | | | 0.0000 |
| S21 | Spherical | Infinite | | | | | |

The following Table 8 shows higher-order coefficients A4, A6, A8, A10, A12, A14, A16 and A18 applied to each of the aspheric mirror surfaces S1-S18 of the aspheric lenses in Embodiment 3 of the disclosure. A surface type of each aspheric mirror surface may be defined by the formula (1) given in Embodiment 1.

TABLE 8

| Surface number | A4 | A6 | A8 | A10 | A12 | A14 | A16 | A18 |
|---|---|---|---|---|---|---|---|---|
| S1 | -7.4787E-04 | -2.7968E-05 | -7.5011E-06 | -3.3198E-06 | 1.7813E-06 | -3.0527E-07 | 2.3193E-08 | -6.5054E-10 |
| S2 | 2.3845E-03 | -2.3125E-03 | 7.1519E-04 | -1.0721E-04 | 7.8722E-06 | -1.9880E-07 | -4.0177E-09 | 1.6655E-10 |
| S3 | 5.7521E-03 | -4.4423E-03 | 1.7330E-03 | -4.3255E-04 | 7.4301E-05 | -8.3507E-06 | 5.3398E-07 | -1.4361E-08 |
| S4 | 2.5577E-03 | -2.8784E-03 | 1.4110E-03 | -4.3943E-04 | 9.2749E-05 | -1.2316E-05 | 8.9388E-07 | -2.6513E-08 |
| S5 | -2.7857E-04 | -4.3639E-04 | 3.0731E-04 | -2.5507E-04 | 1.1863E-04 | -2.7754E-05 | 3.0993E-06 | -1.3307E-07 |
| S6 | -2.7702E-04 | 3.1504E-03 | -3.9240E-03 | 1.8989E-03 | -5.0846E-04 | 7.7452E-05 | -6.2476E-06 | 2.0574E-07 |
| S7 | -2.7968E-03 | 6.0046E-03 | -5.5985E-03 | 2.8870E-03 | -8.8115E-04 | 1.5903E-04 | -1.5563E-05 | 6.3192E-07 |
| S8 | -5.0177E-03 | 5.5129E-03 | -4.1689E-03 | 2.3171E-03 | -8.0020E-04 | 1.6697E-04 | -1.8827E-05 | 8.5635E-07 |
| S9 | -1.1484E-03 | 1.0467E-04 | 3.1423E-04 | -2.2275E-04 | 7.5528E-05 | -1.3734E-05 | 1.3148E-06 | -5.0956E-08 |
| S10 | -7.4256E-03 | 8.6988E-05 | 2.9037E-05 | -1.6461E-07 | -1.7647E-05 | 6.5114E-06 | -9.1060E-07 | 4.7312E-08 |
| S11 | -8.4885E-03 | -5.9073E-03 | 4.1061E-03 | -1.4944E-03 | 3.1226E-04 | -3.8219E-05 | 2.5924E-06 | -7.3248E-08 |
| S12 | 3.1690E-03 | -9.1190E-03 | 4.7165E-03 | -1.3325E-03 | 2.2804E-04 | -2.3456E-05 | 1.3310E-06 | -3.1469E-08 |
| S13 | 2.3273E-02 | -1.6637E-02 | 4.9822E-03 | -1.0096E-03 | 1.4491E-04 | -1.3672E-05 | 7.2712E-07 | -1.5596E-08 |
| S14 | 1.0346E-03 | -3.9587E-04 | -8.1679E-04 | 2.6728E-04 | -3.9029E-05 | 3.1261E-06 | -1.3353E-07 | 2.3737E-09 |
| S15 | -3.3718E-02 | 1.1536E-02 | -2.4354E-03 | 3.1317E-04 | -2.6415E-05 | 1.4929E-06 | -5.3316E-08 | 9.0866E-10 |
| S16 | -6.6971E-04 | -1.9890E-03 | 7.2134E-04 | -1.3773E-04 | 1.4964E-05 | -9.2618E-07 | 3.0399E-08 | -4.1063E-10 |
| S17 | -1.4708E-02 | 5.3126E-03 | -1.2380E-03 | 1.6322E-04 | -1.2934E-05 | 6.2180E-07 | -1.6820E-08 | 1.9634E-10 |
| S18 | -3.0062E-02 | 8.8164E-03 | -1.6310E-03 | 1.8294E-04 | -1.2824E-05 | 5.4998E-07 | -1.3178E-08 | 1.3484E-10 |

Figure 12:
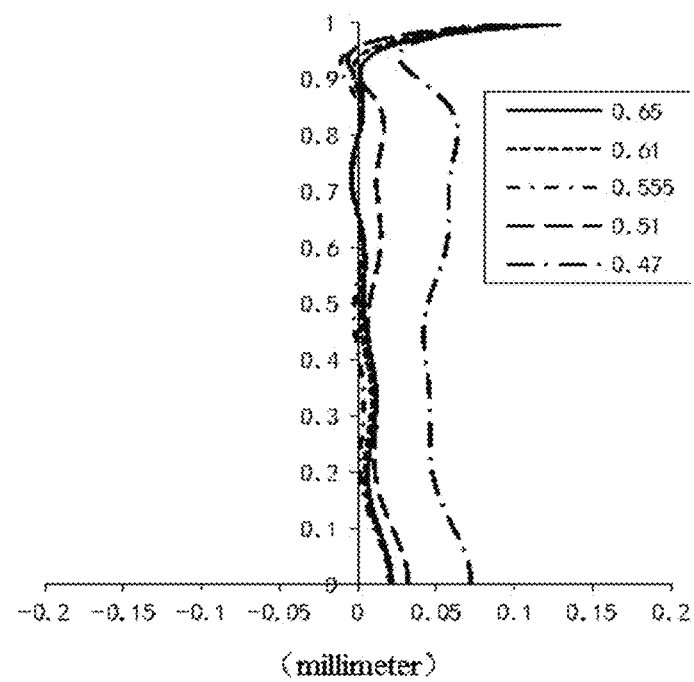
FIGS. 12-15 show a longitudinal aberration curve, an astigmatism curve, a distortion curve and a relative illumination curve of a camera lens assembly according to Embodiment 3 of the disclosure.
Figure 13:
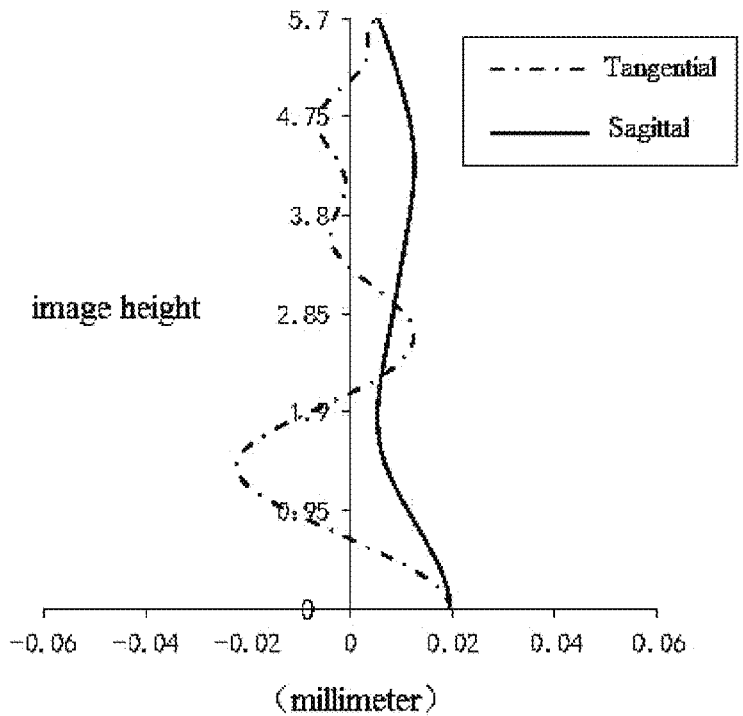
Figure 14:
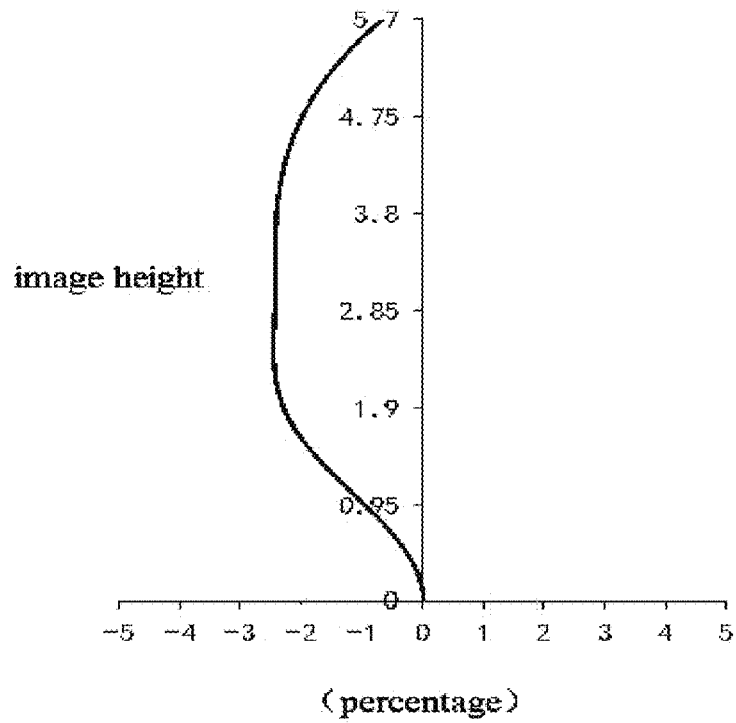
Figure 15:
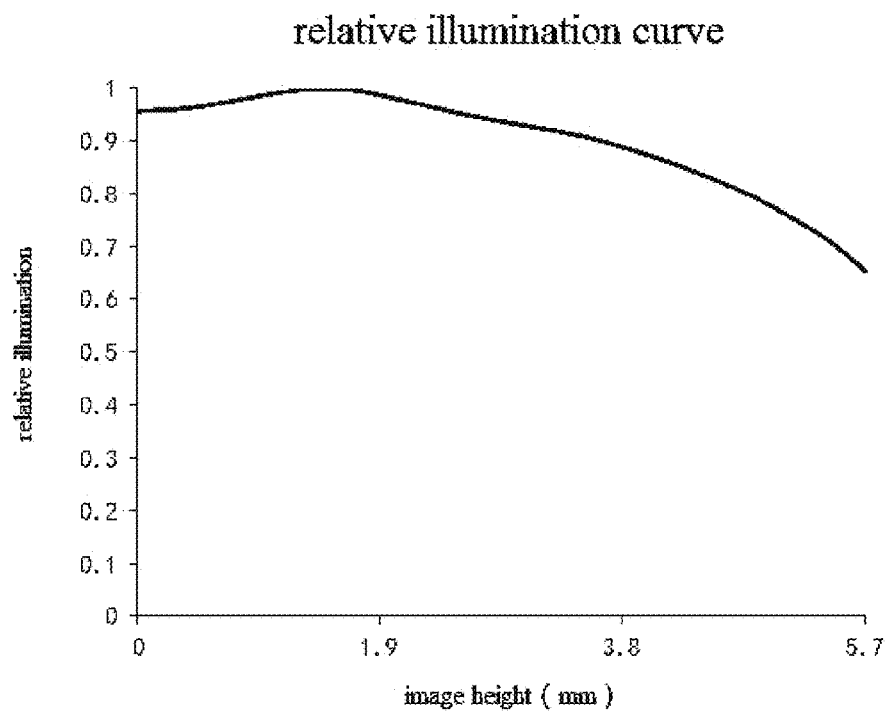

FIG. 12 shows a longitudinal aberration curve of the camera lens assembly according to Embodiment 3 of the disclosure to represent deviation of a convergence focal point after light with different wavelengths passes through the lens. FIG. 13 shows an astigmatism curve of the camera lens assembly according to Embodiment 3 of the disclosure to represent a curvature of tangential image surface and a curvature of sagittal image surface. FIG. 14 shows a distortion curve of the camera lens assembly according to Embodiment 3 of the disclosure to represent distortion values corresponding to different image heights. FIG. 15 shows a relative illumination curve of the camera lens image heights on the imaging surface after the light passes through the lens. According to FIGS. 12-15, it can be seen that the camera lens assembly provided in Embodiment 3 of the disclosure may achieve good imaging quality. assembly according to Embodiment 3 of the disclosure to represent relative illuminations corresponding to different Embodiment 4

Figure 16:
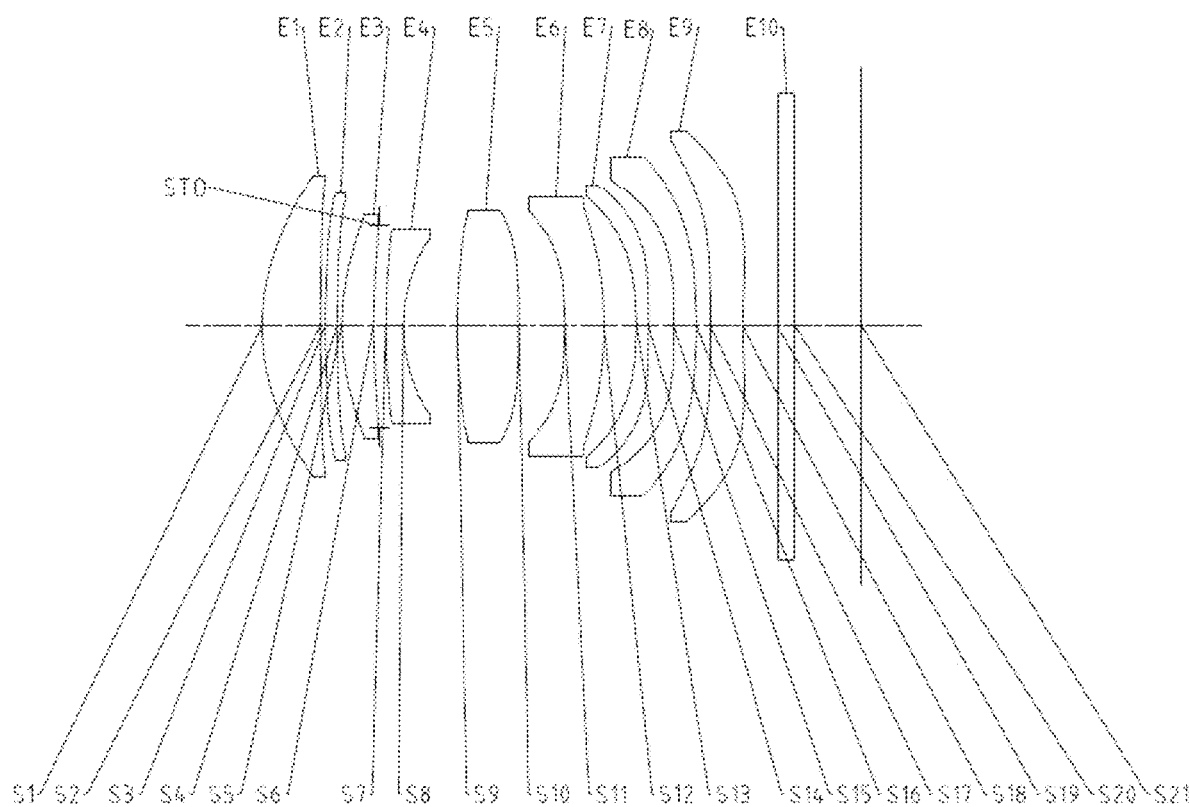
FIG. 16 shows a structural schematic diagram of a camera lens assembly according to Embodiment 4 of the disclosure.

FIG. 16 is a structural schematic diagram of a camera lens assembly according to Embodiment 4 of the disclosure. As shown in FIG. 16, the camera lens assembly sequentially includes from an object-side surface to an image-side surface, a diaphragm STO, a first lens E1, a second lens E2, a third lens E3, a fourth lens E4, a fifth lens E5, a sixth lens E6, a seventh lens E7, an eighth lens E8, a ninth lens E9, an optical filter E10 and an imaging surface S21.

The first lens E1 has a positive refractive power, an object-side surface S1 thereof is a convex surface, and an image-side surface S2 thereof is a concave surface. The second lens E2 has a negative refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a concave surface. The fourth lens E4 has a negative refractive power, an object-side surface S7 thereof is a convex surface, and an image-side surface S8 thereof is a concave surface. The fifth lens E5 has a positive refractive power, an object-side surface S9 thereof is a convex surface, and an image-side surface S10 thereof is a convex surface. The sixth lens E6 has a positive refractive power, an object-side surface S11 thereof is a concave surface, and an image-side surface S12 thereof is a convex surface. The seventh lens E7 has a negative refractive power, an object-side surface S13 thereof is a concave surface, and an image-side surface S14 thereof is a convex surface. The eighth lens E8 has a positive refractive power, an object-side surface S15 thereof is a convex surface, and an image-side surface S16 thereof is a convex surface. The ninth lens E9 has a negative refractive power, an object-side surface S17 thereof is a concave surface, and an image-side surface S18 thereof is a concave surface. The optical filter E10 has an object-side surface S18 and an image-side surface S20. Light from an object sequentially penetrates through each of the surfaces S1 to S20 and is finally imaged on the imaging surface S21.

In Embodiment 4 of the disclosure, explanations about parameters of each relational expression are the same as those in Embodiment 1, and numerical values of each relational expression are listed in the following Table 9.

TABLE 9

Embodiment 4

| | | | |
|---|---|---|---|
| TTL (mm) | 13.24 | ImgH (mm) | 5.70 |
| FOV(°) | 45.8 | TTL/f | 0.99 |
| f7/f9 | 0.72 | f1/f | 0.72 |
| R13/f | −0.42 | DT92/TD | 0.41 |
| DT32/DT41 | 1.06 | R8/f4 | −0.50 |
| CT5/ΣCT | 0.22 | DT11/ImgH | 0.58 |
| CT6/CT7 | 3.31 | CT3/ET3 | 2.30 |
| R11/R12 | 1.18 | SAG51/CT5 | 0.18 |
| Tr9r12/Tr13r18 | 1.39 | CT2/CT3 | 0.37 |
| BFL/TTL | 0.20 | 10 × (T45 + T56 + T67)/TTL | 2.21 |

Table 10 shows basic parameters of the camera lens assembly of Embodiment 4 of the disclosure, wherein the units of the curvature radius, the thickness and the focal length are all millimeters.

TABLE 10

| Surface number | Surface type | Curvature radius | Thickness | Focal length | Refractive index | Abbe number | Conic coefficient |
|---|---|---|---|---|---|---|---|
| OBJ | Spherical | Infinite | Infinite | | | | |
| S1 | Aspheric | 4.8134 | 1.2855 | 9.61 | 1.55 | 56.1 | −0.2749 |
| S2 | Aspheric | 52.7864 | 0.1041 | | | | −98.6551 |
| S3 | Aspheric | 31.5729 | 0.2600 | −1140.55 | 1.65 | 23.5 | 98.4573 |
| S4 | Aspheric | 30.1751 | 0.1063 | | | | 97.9819 |
| S5 | Aspheric | 5.7500 | 0.6955 | 16.40 | 1.55 | 56.1 | 0.1841 |
| S6 | Aspheric | 15.3799 | 0.1389 | | | | 10.0831 |
| STO | Spherical | Infinite | 0.1397 | | | | |
| S7 | Aspheric | 16.0764 | 0.3845 | −7.17 | 1.66 | 21.5 | −59.2954 |
| S8 | Aspheric | 3.6071 | 1.1841 | | | | −0.0993 |
| S9 | Aspheric | 13.8017 | 1.3733 | 16.22 | 1.65 | 23.5 | −7.2487 |
| S10 | Aspheric | −41.4811 | 1.0143 | | | | 96.4236 |
| S11 | Aspheric | −12.0668 | 0.8606 | 85.74 | 1.66 | 21.5 | 15.5706 |
| S12 | Aspheric | −10.2170 | 0.7237 | | | | −0.6313 |
| S13 | Aspheric | −5.5991 | 0.2600 | −13.89 | 1.55 | 56.1 | 1.4881 |
| S14 | Aspheric | −21.7736 | 0.5530 | | | | 47.0492 |
| S15 | Aspheric | −100.0000 | 0.5000 | 32.99 | 1.55 | 56.1 | 99.0000 |
| S16 | Aspheric | −15.2874 | 0.3075 | | | | 14.4081 |
| S17 | Aspheric | 449.6133 | 0.7119 | −19.38 | 1.55 | 56.1 | 99.0000 |
| S18 | Aspheric | 10.3316 | 0.7804 | | | | −63.1091 |
| S19 | Spherical | Infinite | 0.3812 | | 1.52 | 64.2 | |
| S20 | Spherical | Infinite | 1.4745 | | | | |
| S21 | Spherical | Infinite | | | | | |

The following Table 11 shows higher-order coefficients A4, A6, A8, A10, A12, A14, A16 and A18 applied to each of the aspheric mirror surfaces S1-S18 of the aspheric lenses in Embodiment 4 of the disclosure. A surface type of each aspheric mirror surface may be defined by the formula (1) given in Embodiment 1.

TABLE 11

| Surface number | A4 | A6 | A8 | A10 | A12 | A14 | A16 | A18 |
|---|---|---|---|---|---|---|---|---|
| S1 | −7.3037E−04 | −6.2663E−05 | −2.0085E−06 | −1.6979E−06 | 8.7522E−07 | −1.5284E−07 | 1.2370E−08 | −3.7212E−10 |
| S2 | 2.1869E−03 | −2.4285E−03 | 7.9529E−04 | −1.2935E−04 | 1.1510E−05 | −5.4834E−07 | 1.3542E−08 | −1.8277E−10 |
| S3 | 5.1961E−03 | −3.5963E−03 | 1.2040E−03 | −2.6618E−04 | 4.6329E−05 | −5.8618E−06 | 4.2973E−07 | −1.2998E−08 |
| S4 | 1.1086E−03 | −5.4560E−04 | 1.0579E−05 | −4.2676E−06 | 1.5185E−05 | −4.3675E−06 | 4.6396E−07 | −1.7187E−08 |

TABLE 11-continued

| Surface number | A4 | A6 | A8 | A10 | A12 | A14 | A16 | A18 |
|---|---|---|---|---|---|---|---|---|
| S5 | −1.6668E−03 | 1.1336E−03 | −5.8863E−04 | 8.3259E−05 | 2.8570E−05 | −1.2284E−05 | 1.6545E−06 | −7.9195E−08 |
| S6 | 1.2099E−03 | 4.1578E−05 | −1.1575E−03 | 6.0749E−04 | −1.6705E−04 | 2.5911E−05 | −2.0904E−06 | 6.5165E−08 |
| S7 | −7.6267E−04 | 2.0614E−03 | −2.1577E−03 | 1.2239E−03 | −4.2030E−04 | 8.6603E−05 | −9.7142E−06 | 4.5268E−07 |
| S8 | −3.8936E−03 | 3.0156E−03 | −1.7265E−03 | 9.8708E−04 | −3.8100E−04 | 9.1195E−05 | −1.1829E−05 | 6.2437E−07 |
| S9 | −1.3788E−03 | 3.0185E−04 | 1.5825E−04 | −1.2588E−04 | 4.5602E−05 | −9.2224E−06 | 1.0051E−06 | −4.4060E−08 |
| S10 | −7.6712E−03 | 3.5468E−04 | −9.7881E−05 | 3.1989E−05 | −1.6886E−05 | 4.3429E−06 | −5.3494E−07 | 2.7436E−08 |
| S11 | −1.1961E−02 | −4.9941E−04 | 4.5398E−04 | −1.3098E−04 | 2.6056E−05 | −6.0593E−06 | 9.2574E−07 | −4.9574E−08 |
| S12 | −2.6334E−03 | −1.6634E−03 | 6.1626E−04 | −5.8101E−05 | −8.0679E−06 | 2.3831E−06 | −2.1001E−07 | 7.1954E−09 |
| S13 | 2.2580E−02 | −1.4461E−02 | 4.1950E−03 | −8.2237E−04 | 1.1333E−04 | −1.0122E−05 | 5.0050E−07 | −9.7105E−09 |
| S14 | 7.9717E−03 | −9.1483E−03 | 2.5339E−03 | −4.7019E−04 | 6.2255E−05 | −5.4472E−06 | 2.7276E−07 | −5.8033E−09 |
| S15 | −2.0721E−02 | 3.3167E−03 | −1.1264E−03 | 2.9049E−04 | −4.2133E−05 | 3.2918E−06 | −1.3288E−07 | 2.2233E−09 |
| S16 | −4.5113E−03 | 1.0194E−03 | −4.9309E−04 | 1.2441E−04 | −1.6669E−05 | 1.2242E−06 | −4.6585E−08 | 7.1802E−10 |
| S17 | −9.7823E−03 | 2.7699E−03 | −6.1176E−04 | 7.2978E−05 | −5.0115E−06 | 2.0513E−07 | −4.7504E−09 | 4.8332E−11 |
| S18 | −1.1897E−02 | 1.8288E−03 | −2.5573E−04 | 2.1814E−05 | −1.1652E−06 | 3.9828E−08 | −8.1802E−10 | 7.7090E−12 |

Figure 17:
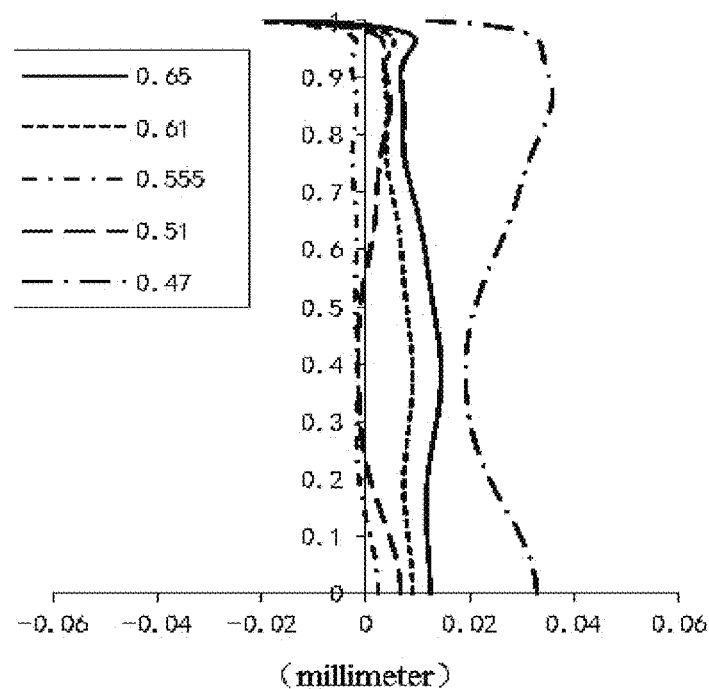
FIGS. 17-20 show a longitudinal aberration curve, an astigmatism curve, a distortion curve and a relative illumination curve of a camera lens assembly according to Embodiment 4 of the disclosure.
Figure 18:
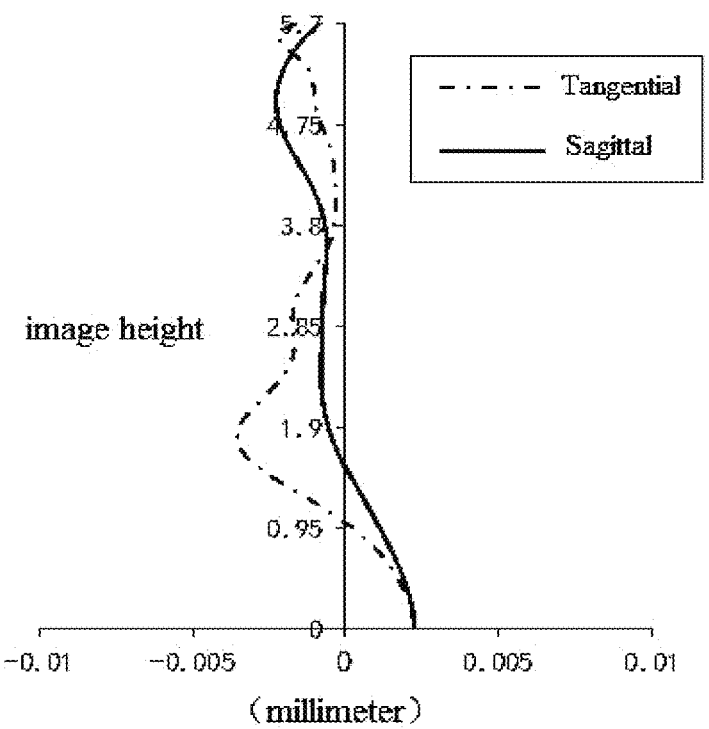
Figure 19:
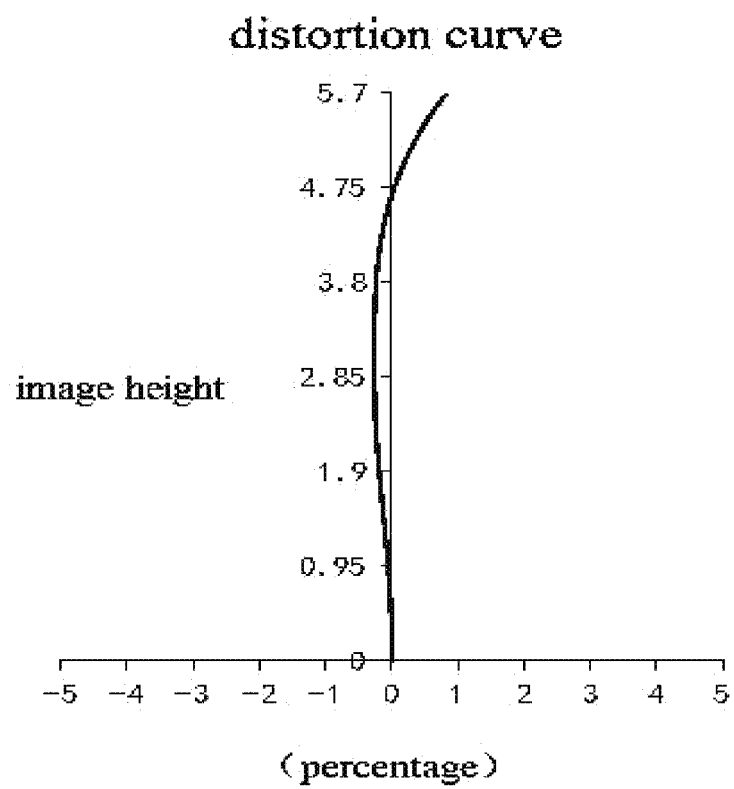
Figure 20:
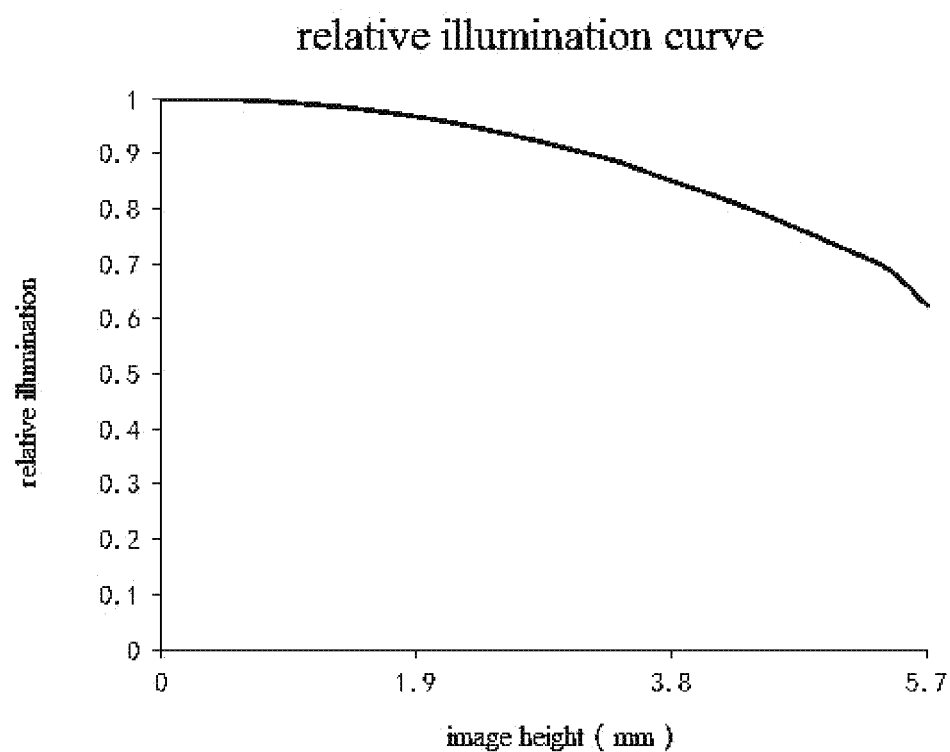

FIG. 17 shows a longitudinal aberration curve of the camera lens assembly according to Embodiment 4 of the disclosure to represent deviation of a convergence focal point after light with different wavelengths passes through the lens. FIG. 18 shows an astigmatism curve of the camera lens assembly according to Embodiment 4 of the disclosure to represent a curvature of tangential image surface and a curvature of sagittal image surface. FIG. 19 shows a distortion curve of the camera lens assembly according to Embodiment 4 of the disclosure to represent distortion values corresponding to different image heights. FIG. 20 shows a relative illumination curve of the camera lens assembly according to Embodiment 4 of the disclosure to represent relative illuminations corresponding to different image heights on the imaging surface after the light passes through the lens. According to FIGS. 17-20, it can be seen that the camera lens assembly provided in Embodiment 4 of the disclosure may achieve good imaging quality.

Embodiment 5

Figure 21:
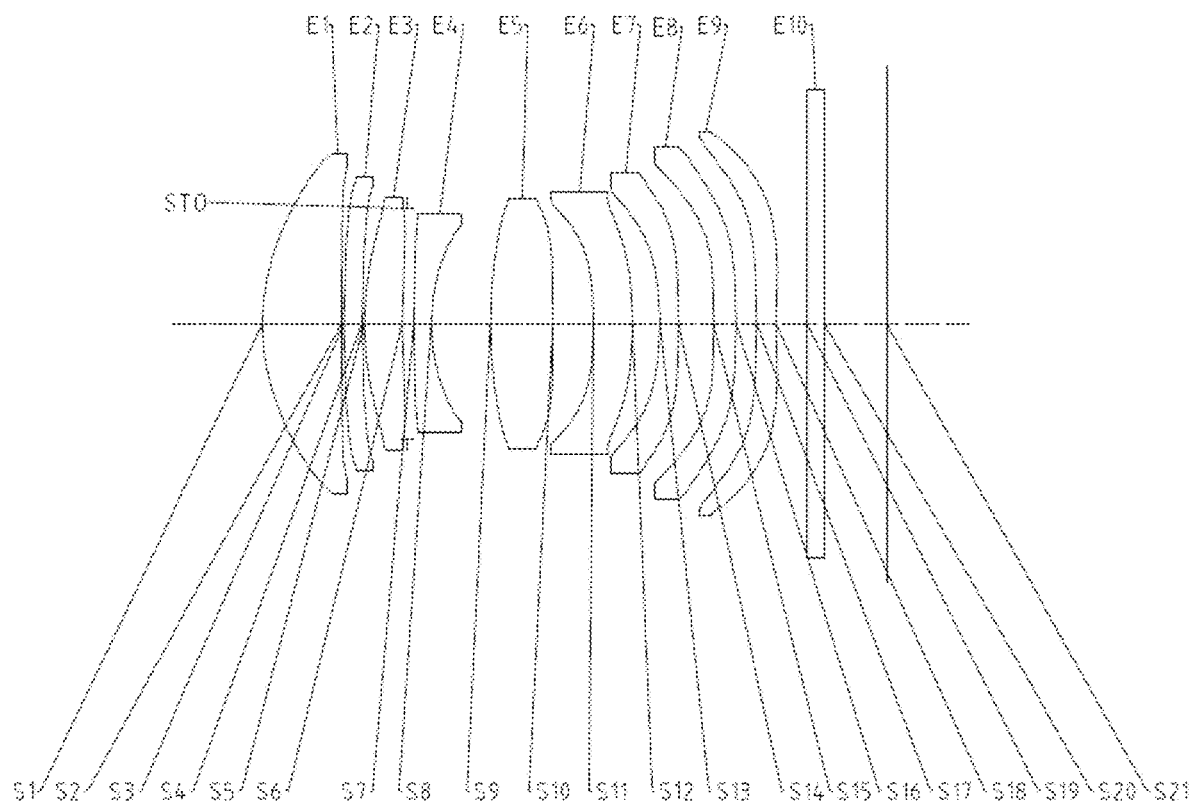
FIG. 21 shows a structural schematic diagram of a camera lens assembly according to Embodiment 5 of the disclosure.

FIG. 21 shows a structural schematic diagram of a camera lens assembly according to Embodiment 5 of the disclosure. As shown in FIG. 21, the camera lens assembly sequentially includes from an object-side surface to an image-side surface, a diaphragm STO, a first lens E1, a second lens E2, a third lens E3, a fourth lens E4, a fifth lens E5, a sixth lens E6, a seventh lens E7, an eighth lens E8, a ninth lens E9, an optical filter E10 and an imaging surface S21.

The first lens E1 has a positive refractive power, an object-side surface S1 thereof is a convex surface, and an image-side surface S2 thereof is a concave surface. The second lens E2 has a negative refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a concave surface. The fourth lens E4 has a negative refractive power, an object-side surface S7 thereof is a convex surface, and an image-side surface S8 thereof is a concave surface. The fifth lens E5 has a positive refractive power, an object-side surface S9 thereof is a convex surface, and an image-side surface S10 thereof is a convex surface. The sixth lens E6 has a positive refractive power, an object-side surface S11 thereof is a concave surface, and an image-side surface S12 thereof is a convex surface. The seventh lens E7 has a negative refractive power, an object-side surface S13 thereof is a concave surface, and an image-side surface S14 thereof is a convex surface. The eighth lens E8 has a positive refractive power, an object-side surface S15 thereof is a concave surface, and an image-side surface S16 thereof is a convex surface. The ninth lens E9 has a negative refractive power, an object-side surface S17 thereof is a concave surface, and an image-side surface S18 thereof is a concave surface. The optical filter E10 has an object-side surface S18 and an image-side surface S20. Light from an object sequentially penetrates through each of the surfaces S1 to S20 and is finally imaged on the imaging surface S21.

In Embodiment 5 of the disclosure, explanations about parameters of each relational expression are the same as those in Embodiment 1, and numerical values of each relational expression are listed in the following Table 12.

TABLE 12

| Embodiment 5 | | | |
|---|---|---|---|
| TTL (mm) | 13.78 | ImgH (mm) | 5.70 |
| FOV(°) | 43.2 | TTL/f | 0.98 |
| f7/f9 | 0.80 | f1/f | 0.68 |
| R13/f | −0.40 | DT92/TD | 0.37 |
| DT32/DT41 | 1.09 | R8/f4 | −0.56 |
| CT5/ΣCT | 0.20 | DT11/ImgH | 0.66 |
| CT6/CT7 | 2.15 | CT3/ET3 | 2.14 |
| R11/R12 | 1.35 | SAG51/CT5 | 0.30 |
| Tr9r12/Tr13r18 | 1.22 | CT2/CT3 | 0.48 |
| BFL/TTL | 0.18 | 10 × (T45 + T56 + T67)/TTL | 2.05 |

Table 13 shows basic parameters of the camera lens assembly of Embodiment 5 of the disclosure, wherein the units of the curvature radius, the thickness and the focal length are all millimeters.

TABLE 13

| Surface number | Surface type | Curvature radius | Thickness | Focal length | Refractive index | Abbe number | Conic coefficient |
|---|---|---|---|---|---|---|---|
| OBJ | Spherical | Infinite | Infinite | | | | |
| S1 | Aspheric | 4.9025 | 1.7464 | 9.50 | 1.55 | 56.1 | −0.2140 |
| S2 | Aspheric | 77.7665 | 0.0500 | | | | −98.6551 |

TABLE 13-continued

| Surface number | Surface type | Curvature radius | Thickness | Focal length | Refractive index | Abbe number | Conic coefficient |
|---|---|---|---|---|---|---|---|
| S3 | Aspheric | 35.8096 | 0.4000 | −358.40 | 1.65 | 23.5 | 98.4573 |
| S4 | Aspheric | 30.8681 | 0.0500 | | | | 97.9819 |
| S5 | Aspheric | 6.8973 | 0.8365 | 18.10 | 1.55 | 56.1 | 0.0688 |
| S6 | Aspheric | 21.8583 | 0.1135 | | | | 10.0831 |
| STO | Spherical | Infinite | 0.1397 | | | | |
| S7 | Aspheric | 30.6156 | 0.3845 | −7.49 | 1.66 | 21.5 | −59.2954 |
| S8 | Aspheric | 4.2134 | 1.3215 | | | | −0.0273 |
| S9 | Aspheric | 11.0823 | 1.3733 | 18.94 | 1.65 | 23.5 | −3.1094 |
| S10 | Aspheric | 114.1281 | 0.8950 | | | | 96.4236 |
| S11 | Aspheric | −12.6947 | 0.8606 | 49.72 | 1.66 | 21.5 | 18.1882 |
| S12 | Aspheric | −9.3851 | 0.6109 | | | | 2.4351 |
| S13 | Aspheric | −5.6727 | 0.4000 | −13.62 | 1.55 | 56.1 | 1.4228 |
| S14 | Aspheric | −24.4958 | 0.7751 | | | | 47.0492 |
| S15 | Aspheric | −118.4332 | 0.5000 | 32.94 | 1.55 | 56.1 | 64.3182 |
| S16 | Aspheric | −15.6366 | 0.4626 | | | | 13.3144 |
| S17 | Aspheric | −169.7753 | 0.4313 | −17.12 | 1.55 | 56.1 | 99.0000 |
| S18 | Aspheric | 9.9014 | 0.6793 | | | | −99.0000 |
| S19 | Spherical | Infinite | 0.3812 | | 1.52 | 64.2 | |
| S20 | Spherical | Infinite | 1.3733 | | | | |
| S21 | Spherical | Infinite | | | | | |

The following Table 14 shows higher-order coefficients A4, A6, A8, A10, A12, A14, A16 and A18 applied to each of the aspheric mirror surfaces S1-S18 of the aspheric lenses in Embodiment 5 of the disclosure. A surface type of each aspheric mirror surface may be defined by the formula (1) given in Embodiment 1.

TABLE 14

| Surface number | A4 | A6 | A8 | A10 | A12 | A14 | A16 | A18 |
|---|---|---|---|---|---|---|---|---|
| S1 | −6.1227E−04 | −7.1654E−05 | 1.4069E−05 | −3.8117E−06 | 5.8988E−07 | −4.8162E−08 | 1.8791E−09 | −2.0964E−11 |
| S2 | 9.3462E−04 | −2.0565E−03 | 7.7053E−04 | −1.4017E−04 | 1.4678E−05 | −9.1238E−07 | 3.2362E−08 | −5.1929E−10 |
| S3 | 4.1472E−03 | −2.2412E−03 | 4.9475E−04 | −3.8298E−05 | −2.2319E−06 | 5.6936E−07 | −3.2456E−08 | 5.6897E−10 |
| S4 | 1.3303E−03 | 6.4926E−05 | −6.0734E−04 | 2.6391E−04 | −5.2491E−05 | 5.5670E−06 | −3.0658E−07 | 7.0125E−09 |
| S5 | −1.8963E−03 | 5.2623E−04 | −3.2386E−04 | 9.8246E−05 | −8.0199E−06 | −1.5169E−06 | 2.8783E−07 | −1.2969E−08 |
| S6 | 1.6938E−03 | −1.0793E−03 | −8.5939E−05 | 1.2332E−04 | −4.0143E−05 | 6.2279E−06 | −4.6646E−07 | 1.3421E−08 |
| S7 | 5.5881E−04 | −7.8923E−04 | 6.6237E−05 | 1.0292E−04 | −4.5986E−05 | 9.2462E−06 | −8.9392E−07 | 3.3228E−08 |
| S8 | −1.8300E−03 | 7.0510E−04 | −1.7022E−04 | 1.9735E−04 | −8.6225E−05 | 2.0774E−05 | −2.5183E−06 | 1.1789E−07 |
| S9 | −8.3879E−04 | 2.0471E−04 | 6.9265E−05 | −3.2895E−05 | 6.7548E−06 | −4.4862E−07 | −2.3893E−08 | 3.1842E−09 |
| S10 | −6.8491E−03 | 1.9990E−04 | −2.9705E−05 | 9.5660E−06 | −9.4898E−06 | 2.4814E−06 | −2.8052E−07 | 1.2609E−08 |
| S11 | −1.1669E−02 | −1.3966E−03 | 6.3714E−04 | −1.0737E−04 | 7.7335E−06 | −1.8305E−06 | 4.3614E−07 | −2.7148E−08 |
| S12 | −7.5390E−04 | −3.0513E−03 | 7.2371E−04 | 2.9372E−05 | −3.9163E−05 | 7.1587E−06 | −5.7821E−07 | 1.9001E−08 |
| S13 | 2.0401E−02 | −1.2176E−02 | 2.8261E−03 | −3.1224E−04 | 1.3517E−06 | 3.8256E−06 | −4.2486E−07 | 1.6337E−08 |
| S14 | 8.7512E−03 | −7.7126E−03 | 1.9691E−03 | −2.8492E−04 | 2.2736E−05 | −7.2725E−07 | −1.6919E−08 | 1.3842E−09 |
| S15 | −9.5482E−03 | −3.2231E−04 | −6.7764E−04 | 3.1627E−04 | −5.6350E−05 | 5.0766E−06 | −2.3258E−07 | 4.3499E−09 |
| S16 | 2.0061E−03 | −6.1444E−04 | −7.1796E−04 | 2.3726E−04 | −3.1947E−05 | 2.2071E−06 | −7.6467E−08 | 1.0407E−09 |
| S17 | −2.2189E−02 | 9.6422E−03 | −2.5175E−03 | 3.5970E−04 | −2.9745E−05 | 1.4141E−06 | −3.5382E−08 | 3.5268E−10 |
| S18 | −2.1646E−02 | 6.2756E−03 | −1.2667E−03 | 1.5063E−04 | −1.0920E−05 | 4.8064E−07 | −1.2002E−08 | 1.3292E−10 |

Figure 22:
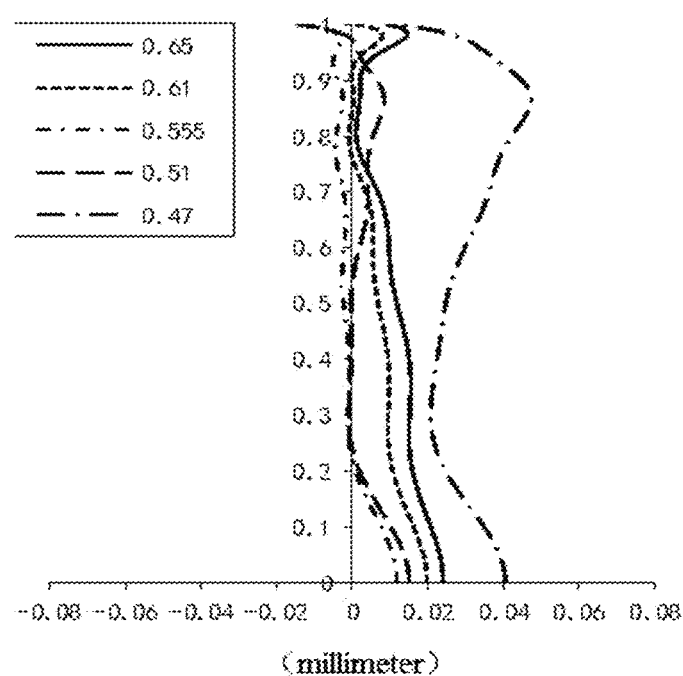
FIGS. 22-25 show a longitudinal aberration curve, an astigmatism curve, a distortion curve and a relative illumination curve of a camera lens assembly according to Embodiment 5 of the disclosure.
Figure 23:
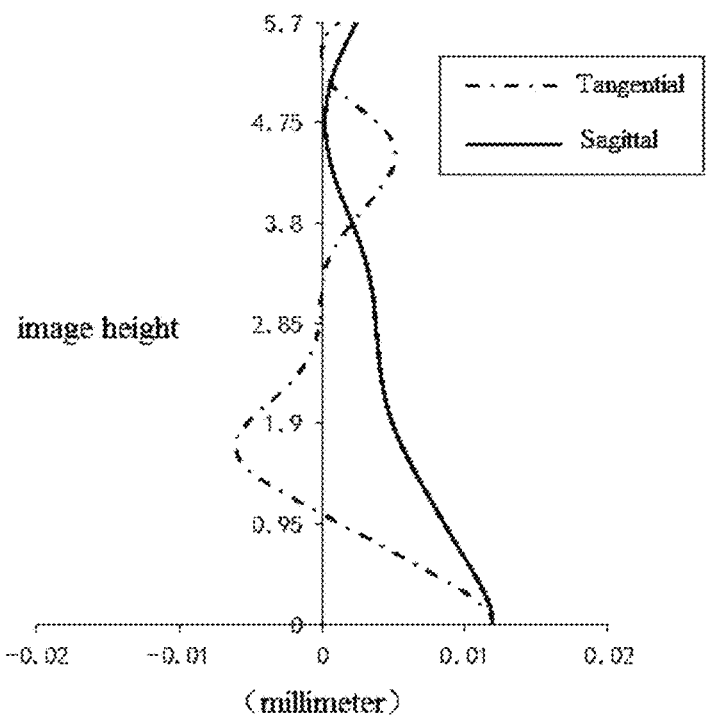
Figure 24:
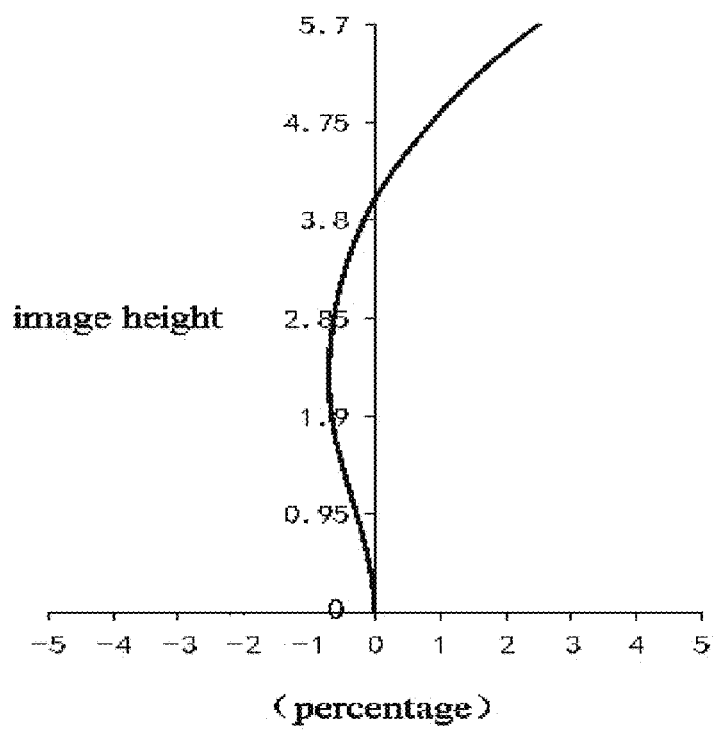
Figure 25:
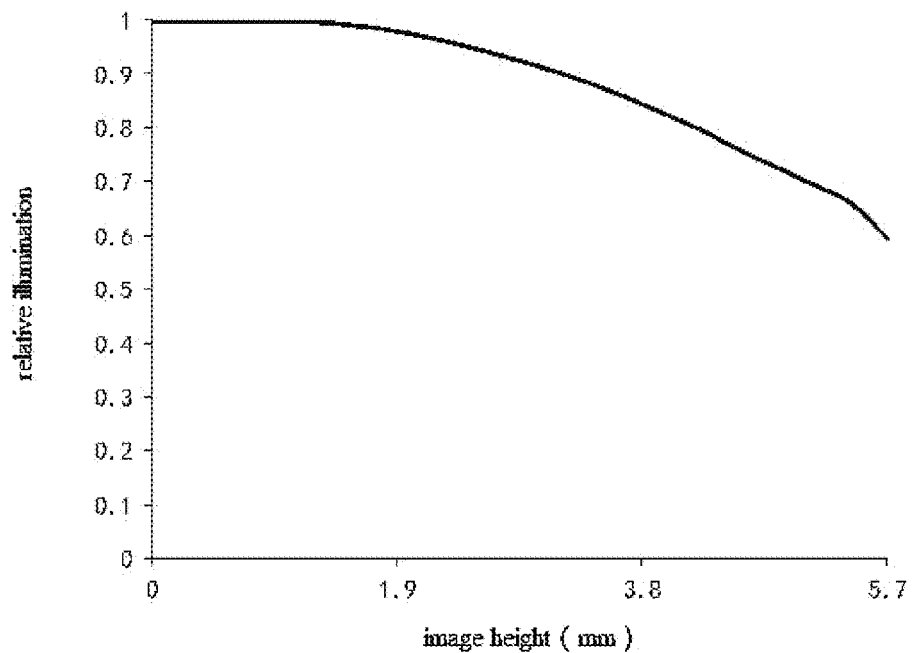

FIG. 22 shows a longitudinal aberration curve of the camera lens assembly according to Embodiment 5 of the disclosure to represent deviation of a convergence focal point after light with different wavelengths passes through the lens. FIG. 23 shows an astigmatism curve of the camera lens assembly according to Embodiment 5 of the disclosure to represent a curvature of tangential image surface and a curvature of sagittal image surface. FIG. 24 shows a distortion curve of the camera lens assembly according to Embodiment 5 of the disclosure to represent distortion values corresponding to different image heights. FIG. 25 shows a relative illumination curve of the camera lens assembly according to Embodiment 5 of the disclosure to represent relative illuminations corresponding to different image heights on the imaging surface after the light passes through the lens. According to FIGS. 22-25, it can be seen that the camera lens assembly provided in Embodiment 5 of the disclosure may achieve good imaging quality.

Embodiment 6

Figure 26:
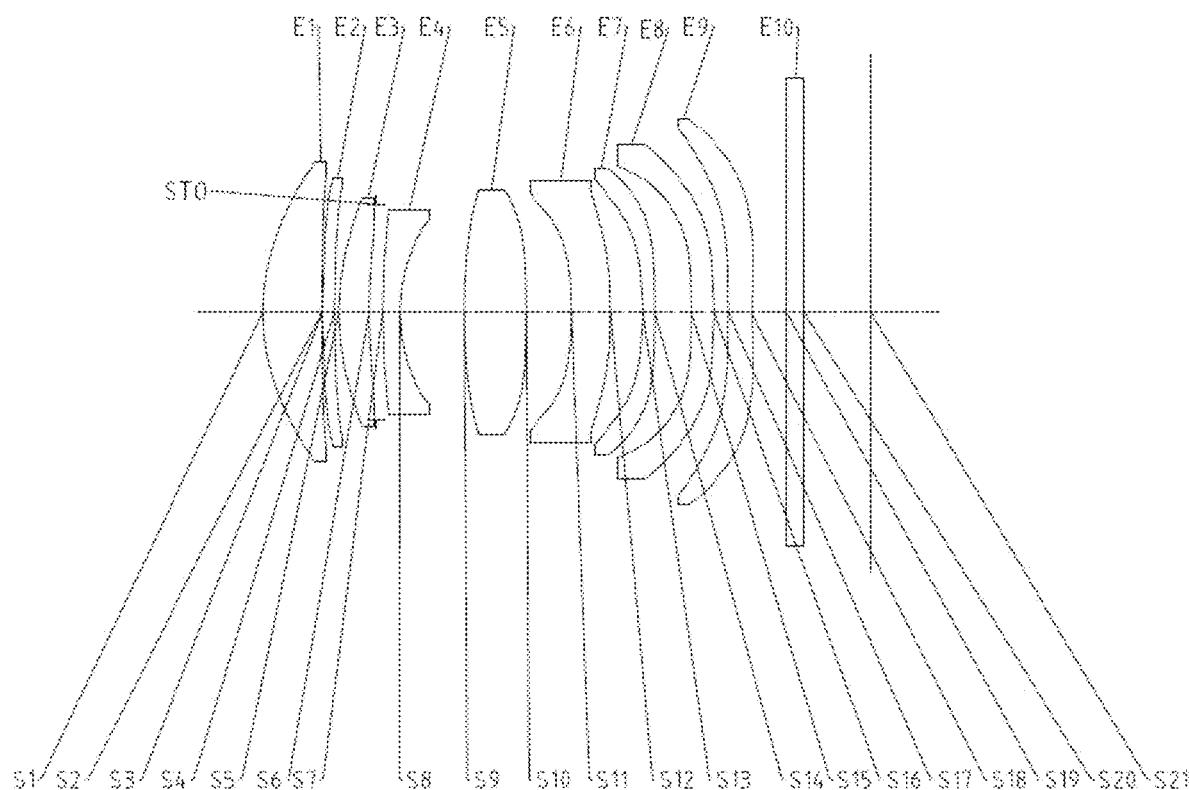
FIG. 26 shows a structural schematic diagram of a camera lens assembly according to Embodiment 6 of the disclosure.

FIG. 26 shows a structural schematic diagram of a camera lens assembly according to Embodiment 6 of the disclosure. As shown in FIG. 26, the camera lens assembly sequentially includes from an object-side surface to an image-side surface, a diaphragm STO, a first lens E1, a second lens E2, a third lens E3, a fourth lens E4, a fifth lens E5, a sixth lens E6, a seventh lens E7, an eighth lens E8, a ninth lens E9, an optical filter E10 and an imaging surface S21.

The first lens E1 has a positive refractive power, an object-side surface S1 thereof is a convex surface, and an image-side surface S2 thereof is a concave surface. The second lens E2 has a negative refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a concave surface. The fourth lens E4 has a negative refractive power, an object-side surface S7 thereof is a convex surface, and an image-side surface S8 thereof is a concave surface. The fifth lens E5 has a positive refractive power, an object-side surface S9 thereof is a convex surface, and an image-side surface S10 thereof is a convex surface. The sixth lens E6 has a negative refractive power, an object-side surface S11 thereof is a concave surface, and an image-side surface S12 thereof is a convex surface. The seventh lens E7 has a negative refractive power, an object-side surface S13 thereof is a concave surface, and an image-side surface S14 thereof is a convex surface. The eighth lens E8 has a positive refractive power, an object-side surface S15 thereof is a concave surface, and an image-side surface S16 thereof is a convex surface. The ninth lens E9 has a negative refractive power, an object-side surface S17 thereof is a concave surface, and an image-side surface S18 thereof is a concave surface. The optical filter E10 has an object-side surface S18 and an image-side surface S20. Light from an object sequentially penetrates through each of the surfaces S1 to S20 and is finally imaged on the imaging surface S21.

In Embodiment 6 of the disclosure, explanations about parameters of each relational expression are the same as those in Embodiment 1, and numerical values of each relational expression are listed in the following Table 15.

TABLE 15

| Embodiment 6 | | | |
|---|---|---|---|
| TTL (mm) | 13.43 | ImgH (mm) | 5.70 |
| FOV(°) | 44.2 | TTL/f | 0.96 |
| f7/f9 | 0.95 | f1/f | 0.68 |
| R13/f | −0.45 | DT92/TD | 0.39 |
| DT32/DT41 | 1.06 | R8/T4 | −0.49 |
| CT5/ΣCT | 0.22 | DT11/ImgH | 0.58 |
| CT6/CT7 | 3.31 | CT3/ET3 | 2.39 |
| R11/R12 | 0.90 | SAG51/CT5 | 0.23 |
| Tr9r12/Tr13r18 | 1.34 | CT2/CT3 | 0.39 |
| BFL/TTL | 0.20 | 10 × (T45 + T56 + T67)/TTL | 2.34 |

Table 16 shows basic parameters of the camera lens assembly of Embodiment 6 of the disclosure, wherein the units of the curvature radius, the thickness and the focal length are all millimeters.

TABLE 16

| Surface number | Surface type | Curvature radius | Thickness | Focal length | Refractive index | Abbe number | Conic coefficient |
|---|---|---|---|---|---|---|---|
| OBJ | Spherical | Infinite | Infinite | | | | |
| S1 | Aspheric | 4.6791 | 1.2979 | 9.54 | 1.55 | 56.1 | −0.3035 |
| S2 | Aspheric | 41.5077 | 0.0200 | | | | −98.6551 |
| S3 | Aspheric | 32.8821 | 0.2600 | −523.36 | 1.65 | 23.5 | 98.4573 |
| S4 | Aspheric | 29.8688 | 0.0982 | | | | 97.9819 |
| S5 | Aspheric | 5.8584 | 0.6712 | 17.61 | 1.55 | 56.1 | 0.1553 |
| S6 | Aspheric | 14.3940 | 0.1539 | | | | 10.0831 |
| STO | Spherical | Infinite | 0.1397 | | | | |
| S7 | Aspheric | 15.2540 | 0.3845 | −7.51 | 1.66 | 21.5 | −59.2954 |
| S8 | Aspheric | 3.6869 | 1.4264 | | | | −0.1230 |
| S9 | Aspheric | 13.1331 | 1.3733 | 15.35 | 1.65 | 23.5 | −3.8461 |
| S10 | Aspheric | −38.4811 | 0.9942 | | | | 96.4236 |
| S11 | Aspheric | −11.0000 | 0.8606 | −238.03 | 1.66 | 21.5 | 14.8767 |
| S12 | Aspheric | −12.2000 | 0.7160 | | | | 3.6074 |
| S13 | Aspheric | −6.2414 | 0.2600 | −16.03 | 1.55 | 56.1 | 1.7113 |
| S14 | Aspheric | −22.0673 | 0.8043 | | | | 47.0492 |
| S15 | Aspheric | −94.5282 | 0.5000 | 32.84 | 1.55 | 56.1 | 99.0000 |
| S16 | Aspheric | −15.0967 | 0.3185 | | | | 14.2986 |
| S17 | Aspheric | −90.1458 | 0.5198 | −16.95 | 1.55 | 56.1 | 99.0000 |
| S18 | Aspheric | 10.3366 | 0.7777 | | | | −99.0000 |
| S19 | Spherical | Infinite | 0.3812 | | 1.52 | 64.2 | |
| S20 | Spherical | Infinite | 1.4717 | | | | |
| S21 | Spherical | Infinite | | | | | |

The following Table 17 shows higher-order coefficients A4, A6, A8, A10, A12, A14, A16 and A18 applied to each of the aspheric mirror surfaces S1-S18 of the aspheric lenses in Embodiment 6 of the disclosure. A surface type of each aspheric mirror surface may be defined by the formula (1) given in Embodiment 1.

TABLE 17

| Surface number | A4 | A6 | A8 | A10 | A12 | A14 | A16 | A18 |
|---|---|---|---|---|---|---|---|---|
| S1  | −7.0174E−04 | −1.1257E−04 | 3.1713E−05 | −1.3935E−05 | 3.4060E−06 | −4.4113E−07 | 2.8898E−08 | −7.4308E−10 |
| S2  | 2.6543E−03 | −3.4991E−03 | 1.2885E−03 | −2.3124E−04 | 2.2109E−05 | −1.0330E−06 | 1.4817E−08 | 2.2520E−10 |
| S3  | 5.4793E−03 | −3.5945E−03 | 1.0719E−03 | −1.6003E−04 | 1.0412E−05 | 1.2185E−07 | −5.3499E−08 | 2.1532E−09 |
| S4  | 1.4581E−03 | −1.2553E−03 | 3.8133E−04 | −6.8681E−05 | 9.0530E−06 | −8.9951E−07 | 5.2404E−08 | −1.0764E−09 |
| S5  | −5.8193E−04 | −1.0644E−03 | 4.5261E−04 | −9.9687E−05 | 2.3185E−05 | −4.8234E−06 | 5.1166E−07 | −2.0261E−08 |
| S6  | 1.7115E−03 | −2.2121E−04 | −1.2308E−03 | 7.0769E−04 | −1.9678E−04 | 2.9627E−05 | −2.3127E−06 | 7.3071E−08 |
| S7  | −7.5794E−04 | 2.4211E−03 | −2.5279E−03 | 1.3241E−03 | −4.0456E−04 | 7.2922E−05 | −7.1312E−06 | 2.9094E−07 |
| S8  | −3.9801E−03 | 3.5098E−03 | −2.3511E−03 | 1.2927E−03 | −4.4855E−04 | 9.5121E−05 | −1.1029E−05 | 5.2727E−07 |
| S9  | −8.7738E−04 | 2.4105E−04 | 1.2375E−04 | −8.1316E−05 | 2.3627E−05 | −3.6419E−06 | 2.8665E−07 | −8.6032E−09 |
| S10 | −7.3460E−03 | 3.4305E−04 | −2.2629E−05 | −1.3007E−05 | −1.7056E−06 | 1.3540E−06 | −2.0506E−07 | 1.0906E−08 |
| S11 | −1.2848E−02 | −1.4692E−03 | 1.2500E−03 | −4.0380E−04 | 7.7081E−05 | −1.0352E−05 | 9.3852E−07 | −3.6495E−08 |
| S12 | −2.7001E−03 | −3.4525E−03 | 1.6428E−03 | −3.7800E−04 | 5.4400E−05 | −4.9456E−06 | 2.5887E−07 | −5.3995E−09 |
| S13 | 2.2472E−04 | −1.6042E−02 | 4.9682E−03 | −1.0801E−03 | 1.7109E−04 | −1.8020E−05 | 1.0879E−06 | −2.7654E−08 |
| S14 | 9.5461E−03 | −8.9766E−03 | 2.5540E−03 | −4.9084E−04 | 6.6624E−05 | −5.9918E−06 | 3.1060E−07 | −6.8626E−09 |
| S15 | −2.0095E−02 | 3.1541E−03 | −1.2023E−03 | 3.1233E−04 | −4.7037E−05 | 4.1332E−06 | −2.0704E−07 | 4.6259E−09 |
| S16 | −3.4561E−03 | 7.5816E−04 | −7.6529E−04 | 1.7625E−04 | −1.8417E−05 | 9.5037E−07 | −2.0862E−08 | 7.7881E−11 |
| S17 | −1.6628E−02 | 6.8922E−03 | −1.7853E−03 | 2.4917E−04 | −2.0001E−05 | 9.3348E−07 | −2.3620E−08 | 2.5071E−10 |
| S18 | −1.9152E−02 | 4.6015E−03 | −7.9357E−04 | 8.1267E−05 | −5.0434E−06 | 1.8815E−07 | −3.9412E−09 | 3.6249E−11 |

Figure 27:
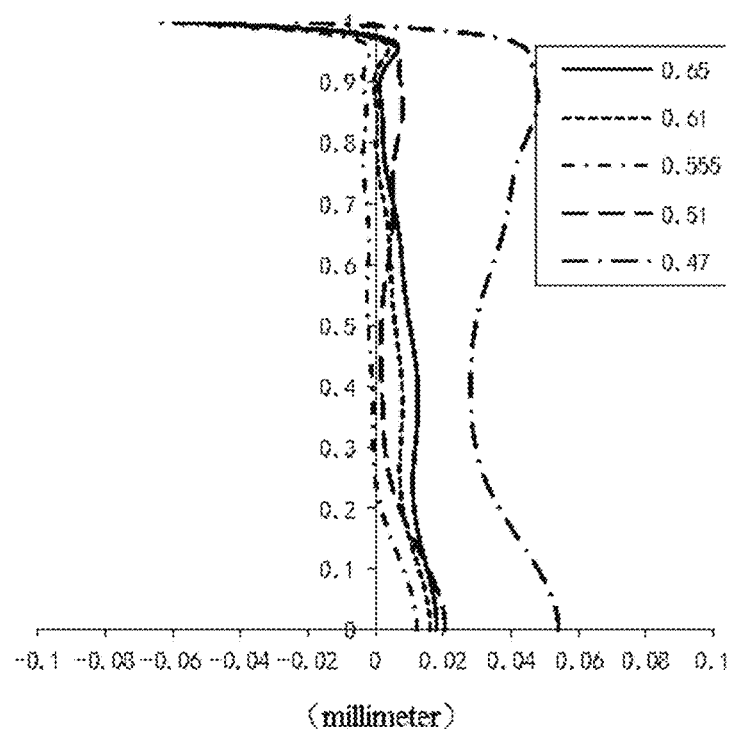
FIGS. 27-30 show a longitudinal aberration curve, an astigmatism curve, a distortion curve and a relative illumination curve of a camera lens assembly according to Embodiment 6 of the disclosure.
Figure 28:
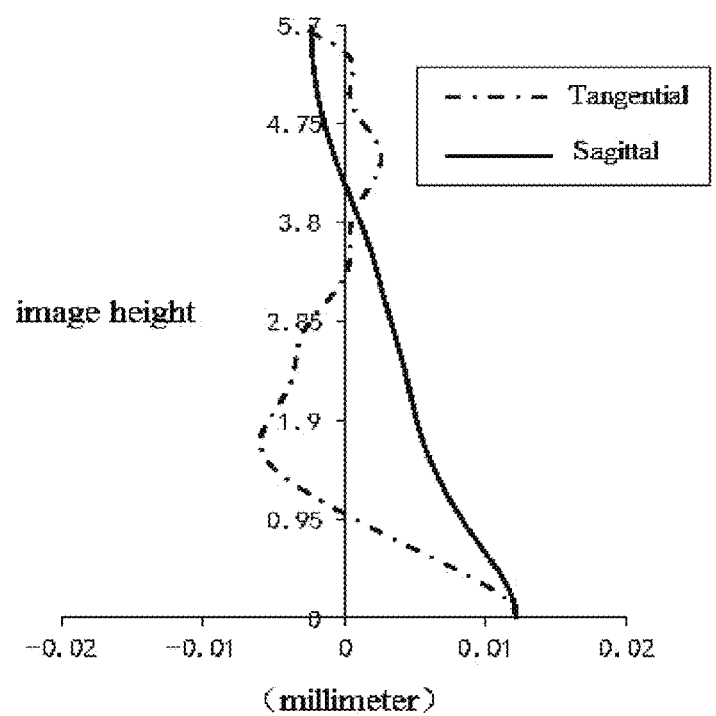
Figure 29:
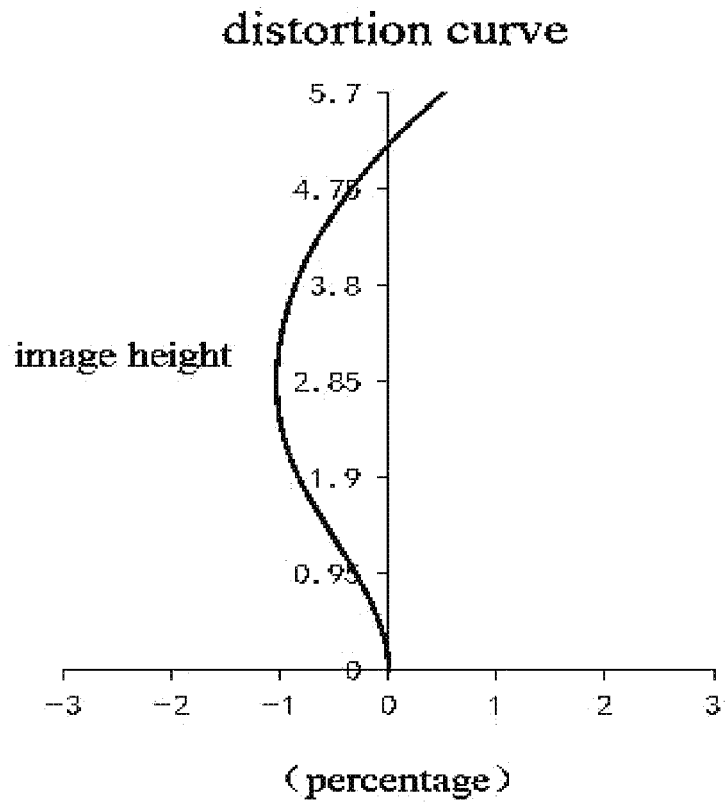
Figure 30:
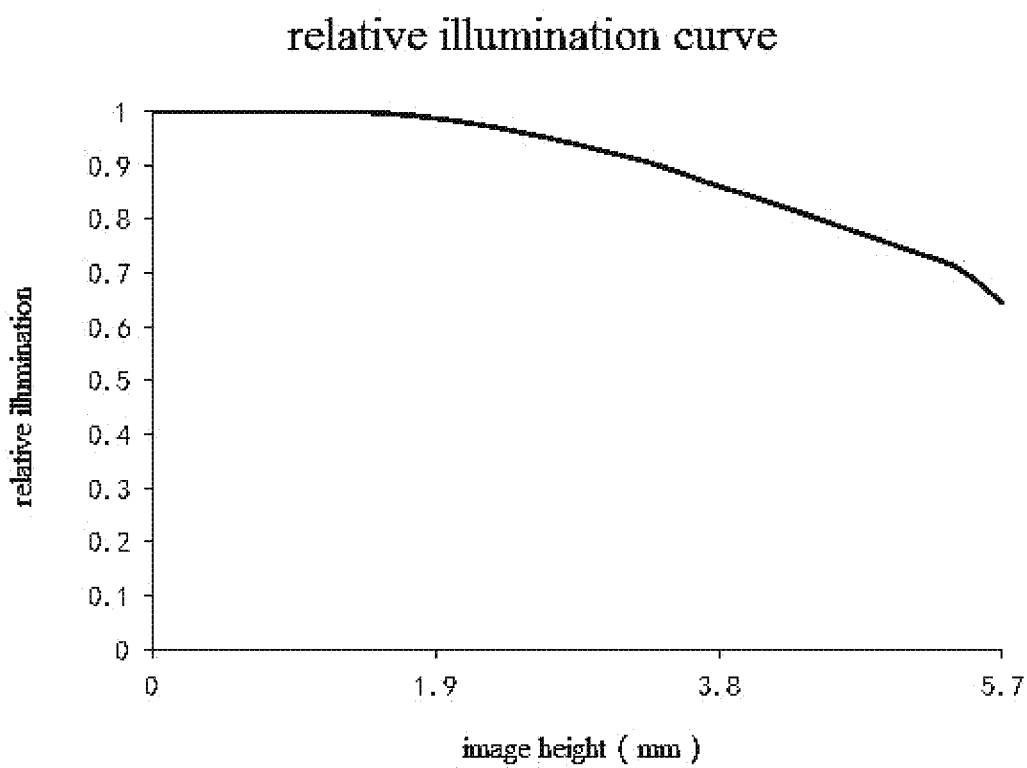

FIG. 27 shows a longitudinal aberration curve of the camera lens assembly according to Embodiment 6 of the disclosure to represent deviation of a convergence focal point after light with different wavelengths passes through the lens. FIG. 28 shows an astigmatism curve of the camera lens assembly according to Embodiment 6 of the disclosure to represent a curvature of tangential image surface and a curvature of sagittal image surface. FIG. 29 shows a distortion curve of the camera lens assembly according to Embodiment 6 of the disclosure to represent distortion values corresponding to different image heights. FIG. 30 shows a relative illumination curve of the camera lens assembly according to Embodiment 6 of the disclosure to represent relative illuminations corresponding to different image heights on the imaging surface after the light passes through the lens. According to FIGS. 27-30, it can be seen that the camera lens assembly provided in Embodiment 6 of the disclosure may achieve good imaging quality.

Embodiment 7

Figure 31:
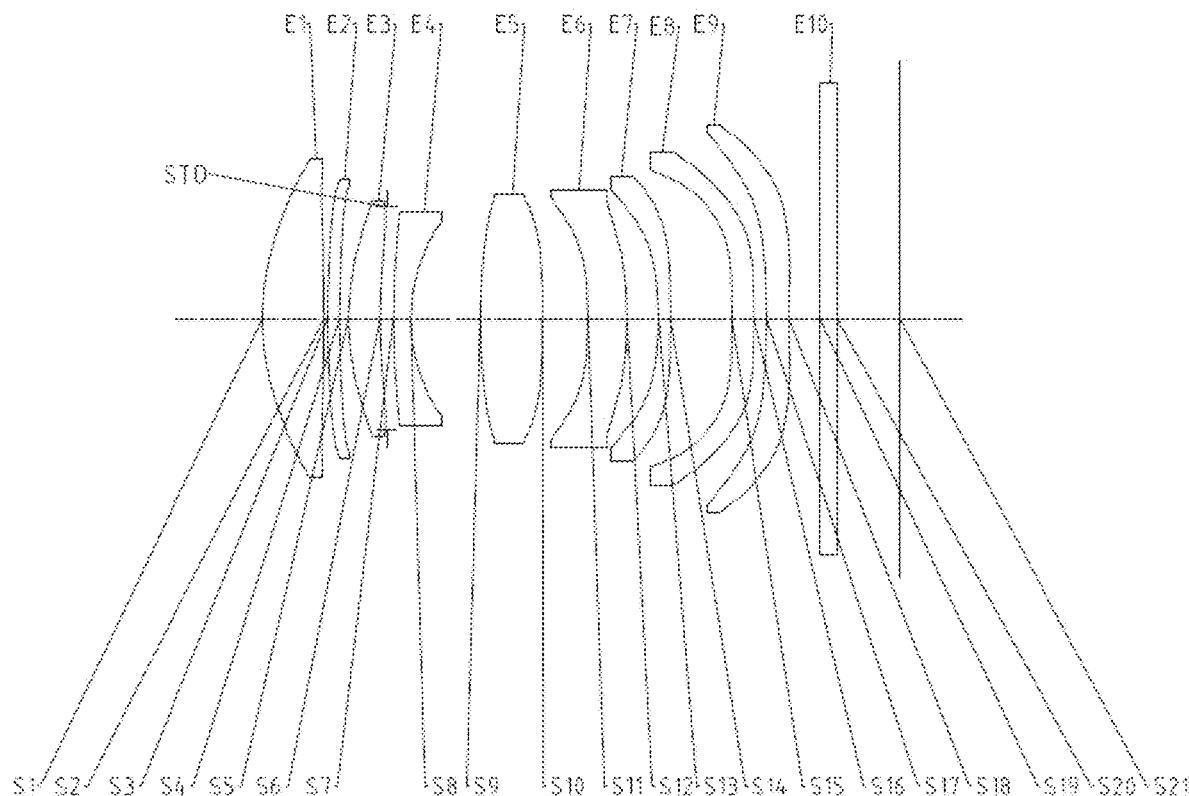
FIG. 31 shows a structural schematic diagram of a camera lens assembly according to Embodiment 7 of the disclosure.

FIG. 31 is a structural schematic diagram of a camera lens assembly according to Embodiment 7 of the disclosure. As shown in FIG. 31, the camera lens assembly sequentially includes from an object-side surface to an image-side surface, a diaphragm STO, a first lens E1, a second lens E2, a third lens E3, a fourth lens E4, a fifth lens E5, a sixth lens E6, a seventh lens E7, an eighth lens E8, a ninth lens E9, an optical filter E10 and an imaging surface S21.

The first lens E1 has a positive refractive power, an object-side surface S1 thereof is a convex surface, and an image-side surface S2 thereof is a convex surface. The second lens E2 has a negative refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a concave surface. The fourth lens E4 has a negative refractive power, an object-side surface S7 thereof is a convex surface, and an image-side surface S8 thereof is a concave surface. The fifth lens E5 has a positive refractive power, an object-side surface S9 thereof is a convex surface, and an image-side surface S10 thereof is a convex surface. The sixth lens E6 has a positive refractive power, an object-side surface S11 thereof is a concave surface, and an image-side surface S12 thereof is a convex surface. The seventh lens E7 has a negative refractive power, an object-side surface S13 thereof is a concave surface, and an image-side surface S14 thereof is a convex surface. The eighth lens E8 has a positive refractive power, an object-side surface S15 thereof is a concave surface, and an image-side surface S16 thereof is a convex surface. The ninth lens E9 has a negative refractive power, an object-side surface S17 thereof is a concave surface, and an image-side surface S18 thereof is a concave surface. The optical filter E10 has an object-side surface S18 and an image-side surface S20. Light from an object sequentially penetrates through each of the surfaces S1 to S20 and is finally imaged on the imaging surface S21.

In Embodiment 7 of the disclosure, explanations about parameters of each relational expression are the same as those in Embodiment 1, and numerical values of each relational expression are listed in the following Table 18.

TABLE 18

| Embodiment 7 | | | |
|---|---|---|---|
| TTL (mm) | 14.08 | ImgH (mm) | 5.70 |
| FOV(°) | 41.2 | TTL/f | 0.95 |
| f7/f9 | 0.97 | f1/f | 0.64 |
| R13/f | −0.40 | DT92/TD | 0.37 |
| DT32/DT41 | 1.06 | R8/f4 | −0.51 |
| CT5/ΣCT | 0.22 | DT11/ImgH | 0.62 |
| CT6/CT7 | 3.31 | CT3/ET3 | 2.53 |
| R11/R12 | 1.19 | SAG51/CT5 | 0.23 |
| Tr9r12/Tr13r18 | 1.12 | CT2/CT3 | 0.37 |
| BFL/TTL | 0.17 | 10 × (T45 + T56 + T67)/TTL | 2.30 |

Table 19 shows basic parameters of the camera lens assembly of Embodiment 7 of the disclosure, wherein the units of the curvature radius, the thickness and the focal length are all millimeters.

TABLE 19

| Surface number | Surface type | Curvature radius | Thickness | Focal length | Refractive index | Abbe number | Conic coefficient |
|---|---|---|---|---|---|---|---|
| OBJ | Spherical | Infinite | Infinite | | | | |
| S1 | Aspheric | 5.4795 | 1.3574 | 9.56 | 1.55 | 56.1 | −0.3487 |
| S2 | Aspheric | −100.0000 | 0.0823 | | | | −98.6551 |
| S3 | Aspheric | 34.1415 | 0.2600 | −431.29 | 1.65 | 23.5 | 98.4573 |
| S4 | Aspheric | 30.3164 | 0.1988 | | | | 97.9819 |
| S5 | Aspheric | 5.9561 | 0.6987 | 18.13 | 1.55 | 56.1 | 0.2419 |
| S6 | Aspheric | 14.3348 | 0.1540 | | | | 10.0831 |
| STO | Spherical | Infinite | 0.1397 | | | | |
| S7 | Aspheric | 17.3291 | 0.3845 | −7.46 | 1.66 | 21.5 | −59.2954 |
| S8 | Aspheric | 3.7857 | 1.5436 | | | | −0.2049 |
| S9 | Aspheric | 14.0531 | 1.3733 | 17.92 | 1.65 | 23.5 | −3.5393 |
| S10 | Aspheric | −62.3708 | 1.0005 | | | | 96.4236 |
| S11 | Aspheric | −12.8731 | 0.8606 | 87.40 | 1.66 | 21.5 | 14.8095 |
| S12 | Aspheric | −10.7922 | 0.6999 | | | | 1.9014 |
| S13 | Aspheric | −5.9101 | 0.2600 | −14.75 | 1.55 | 56.1 | 1.6826 |
| S14 | Aspheric | −22.5764 | 1.3526 | | | | 47.0492 |
| S15 | Aspheric | −89.9362 | 0.5000 | 33.03 | 1.55 | 56.1 | −99.0000 |
| S16 | Aspheric | −15.0516 | 0.2791 | | | | 14.1913 |
| S17 | Aspheric | −233.8296 | 0.4911 | −15.23 | 1.55 | 56.1 | −99.0000 |
| S18 | Aspheric | 8.6289 | 0.6859 | | | | −99.0000 |
| S19 | Spherical | Infinite | 0.3812 | | 1.52 | 64.2 | |
| S20 | Spherical | Infinite | 1.3799 | | | | |
| S21 | Spherical | Infinite | | | | | |

The following Table 20 shows higher-order coefficients A4, A6, A8, A10, A12, A14, A16 and A18 applied to each of the aspheric mirror surfaces S1-S18 of the aspheric lenses in Embodiment 7 of the disclosure. A surface type of each aspheric mirror surface may be defined by the formula (1) given in Embodiment 1.

TABLE 20

| Surface number | A4 | A6 | A8 | A10 | A12 | A14 | A16 | A18 |
|---|---|---|---|---|---|---|---|---|
| S1 | −9.4211E−04 | −1.1768E−04 | 4.0716E−05 | −1.6413E−05 | 3.6469E−06 | −4.2469E−07 | 2.5156E−08 | −5.9397E−10 |
| S2 | 2.0578E−03 | −2.4468E−03 | 8.0419E−04 | −1.3053E−04 | 1.1735E−05 | −5.7242E−07 | 1.3968E−08 | −1.4591E−10 |
| S3 | 5.5870E−03 | −3.3834E−03 | 8.0666E−04 | −3.9459E−05 | −1.7268E−05 | 3.5468E−06 | −2.7104E−07 | 7.7293E−09 |
| S4 | 1.3866E−03 | −1.3885E−03 | 3.8892E−04 | −1.8777E−05 | −1.2556E−05 | 2.8416E−06 | −2.4459E−07 | 7.9020E−09 |
| S5 | −1.6009E−03 | −4.0474E−04 | 3.5800E−04 | −9.7599E−05 | 1.4377E−05 | −1.1802E−06 | 1.3283E−08 | 2.8428E−09 |
| S6 | 1.9216E−03 | −6.9958E−04 | −7.9702E−04 | 4.9453E−04 | −1.3766E−04 | 2.0480E−05 | −1.5858E−06 | 5.0418E−08 |
| S7 | −5.8431E−04 | 2.2740E−03 | −2.3015E−03 | 1.1419E−03 | −3.2785E−04 | 5.5010E−05 | −4.9679E−06 | 1.8626E−07 |
| S8 | −4.4452E−03 | 3.7390E−03 | −2.3476E−03 | 1.1869E−03 | −3.8075E−04 | 7.3585E−05 | −7.6447E−06 | 3.2264E−07 |
| S9 | −1.1495E−03 | 3.9756E−04 | 9.3936E−05 | −6.8740E−05 | 1.8122E−05 | −2.6235E−06 | 2.1166E−07 | −7.1682E−09 |
| S10 | −7.7475E−03 | 4.9195E−04 | 2.4604E−05 | −3.8132E−05 | 4.5813E−06 | 1.9902E−07 | −6.7534E−08 | 3.8898E−09 |
| S11 | −1.3472E−02 | −1.1945E−03 | 9.5552E−04 | −2.1013E−04 | 1.5965E−05 | 5.7368E−07 | −9.8405E−08 | 1.8578E−09 |
| S12 | −3.3318E−03 | −2.7252E−03 | 1.0475E−03 | −1.3063E−04 | −5.3496E−06 | 3.7786E−06 | −4.4305E−07 | 1.8254E−08 |
| S13 | 2.0788E−02 | −1.3961E−02 | 3.7566E−03 | −6.2552E−04 | 6.3100E−05 | −2.7405E−06 | −7.7704E−08 | 9.1879E−09 |
| S14 | 1.2353E−02 | −9.9122E−03 | 2.8819E−03 | −5.4581E−04 | 6.9808E−05 | −5.7885E−06 | 2.7766E−07 | −5.7649E−09 |
| S15 | −3.1225E−03 | −7.6141E−03 | 2.0948E−03 | −2.8225E−04 | 1.6415E−05 | 5.0215E−07 | −1.2553E−07 | 4.8710E−09 |
| S16 | 1.3342E−02 | −1.2286E−02 | 3.6384E−03 | −6.8932E−04 | 8.4732E−05 | −6.3362E−06 | 2.5821E−07 | −4.3673E−09 |
| S17 | −2.4906E−02 | 9.0456E−03 | −1.8787E−03 | 2.0784E−04 | −1.2764E−05 | 4.2485E−07 | −6.6521E−09 | 2.8821E−11 |
| S18 | −2.7546E−02 | 8.3639E−03 | −1.5546E−03 | 1.7217E−04 | −1.2083E−05 | 5.3473E−07 | −1.3665E−08 | 1.5303E−10 |

Figure 32:
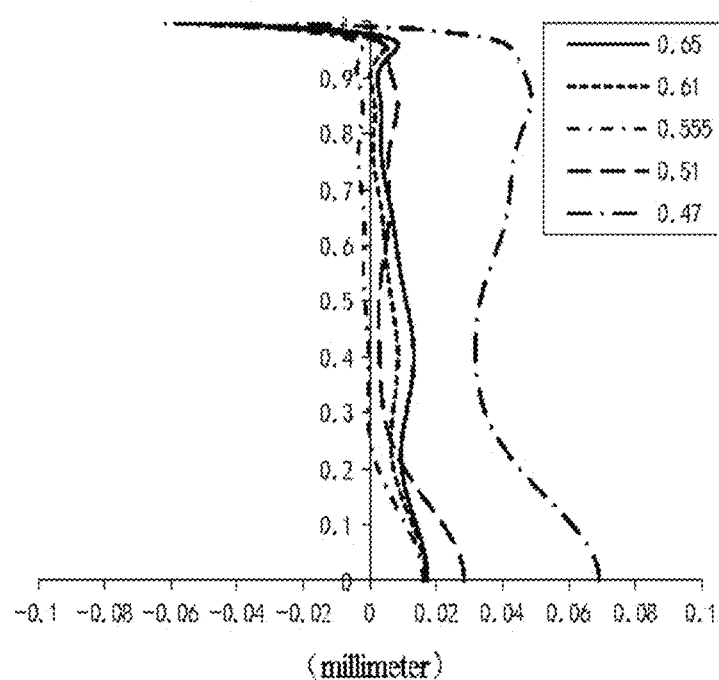
FIGS. 32-35 show a longitudinal aberration curve, an astigmatism curve, a distortion curve and a relative illumination curve of a camera lens assembly according to Embodiment 7 of the disclosure.
Figure 33:
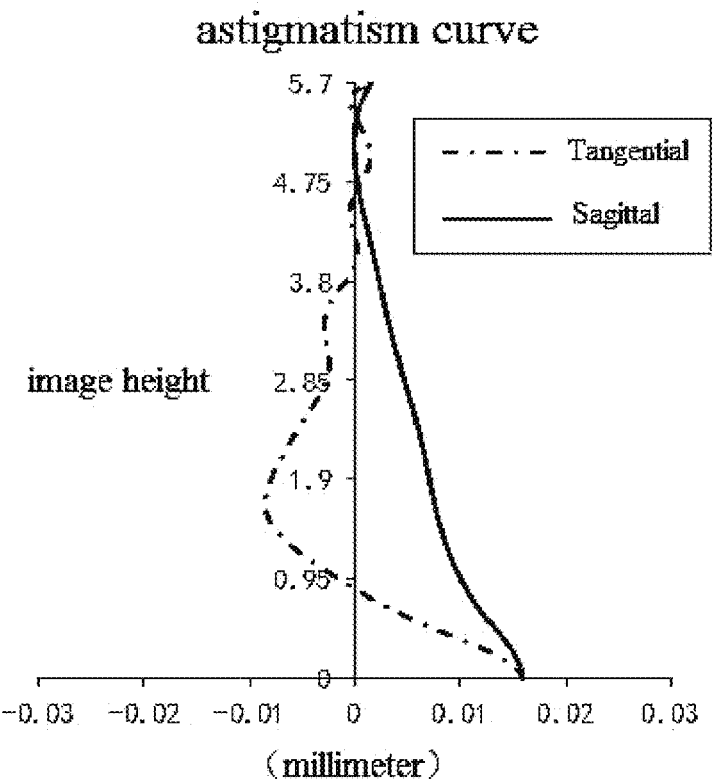
Figure 34:
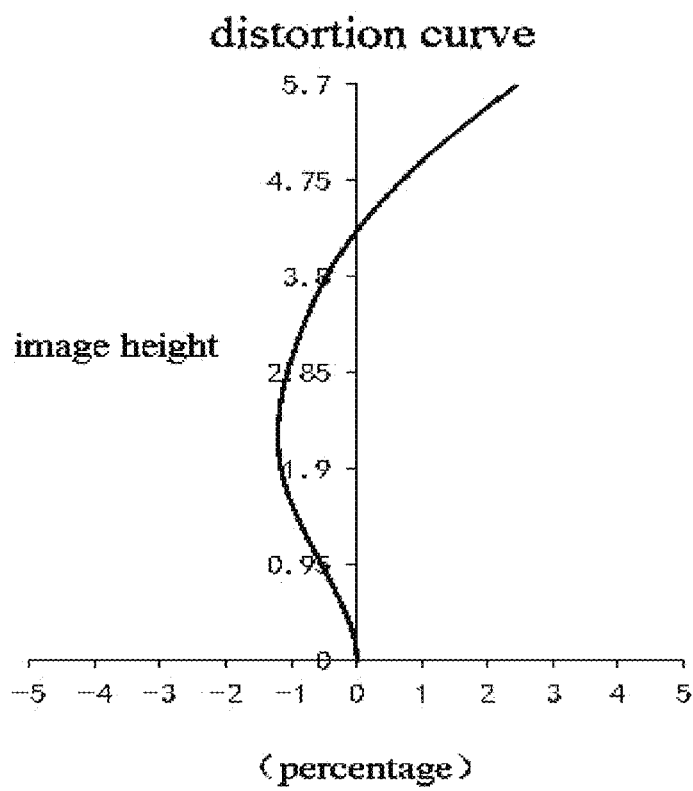
Figure 35:
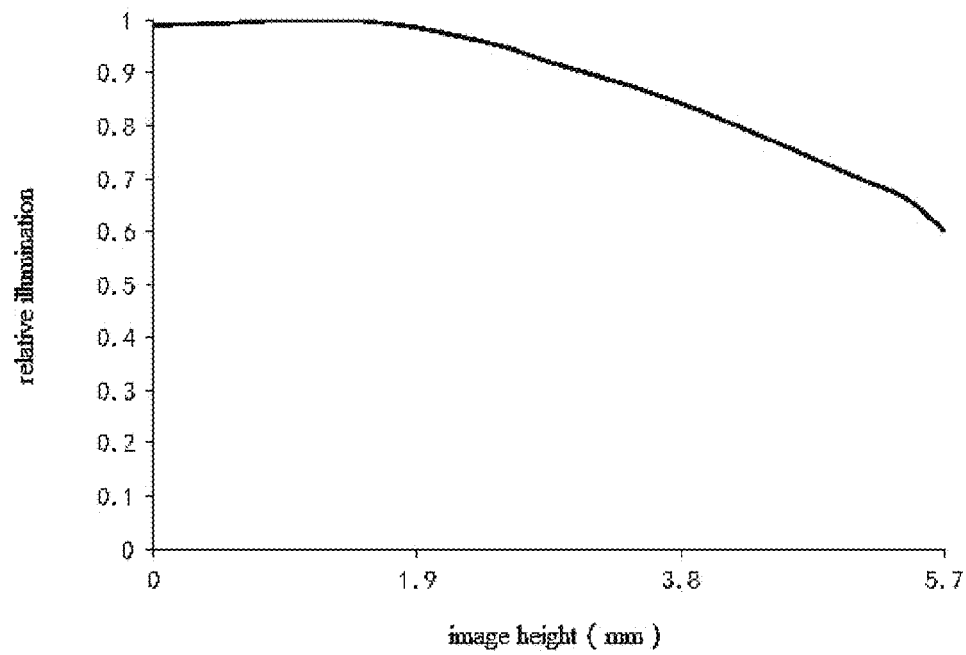

FIG. 32 shows a longitudinal aberration curve of the camera lens assembly according to Embodiment 7 of the disclosure to represent deviation of a convergence focal point after light with different wavelengths passes through the lens. FIG. 33 shows an astigmatism curve of the camera lens assembly according to Embodiment 7 of the disclosure to represent a curvature of tangential image surface and a curvature of sagittal image surface. FIG. 34 shows a distortion curve of the camera lens assembly according to Embodiment 7 of the disclosure to represent distortion values corresponding to different image heights. FIG. 35 shows a relative illumination curve of the camera lens assembly according to Embodiment 7 of the disclosure to represent relative illuminations corresponding to different image heights on the imaging surface after the light passes through the lens. According to FIGS. 32-35, it can be seen that the camera lens assembly provided in Embodiment 7 of the disclosure may achieve good imaging quality.

Embodiment 8

Figure 36:
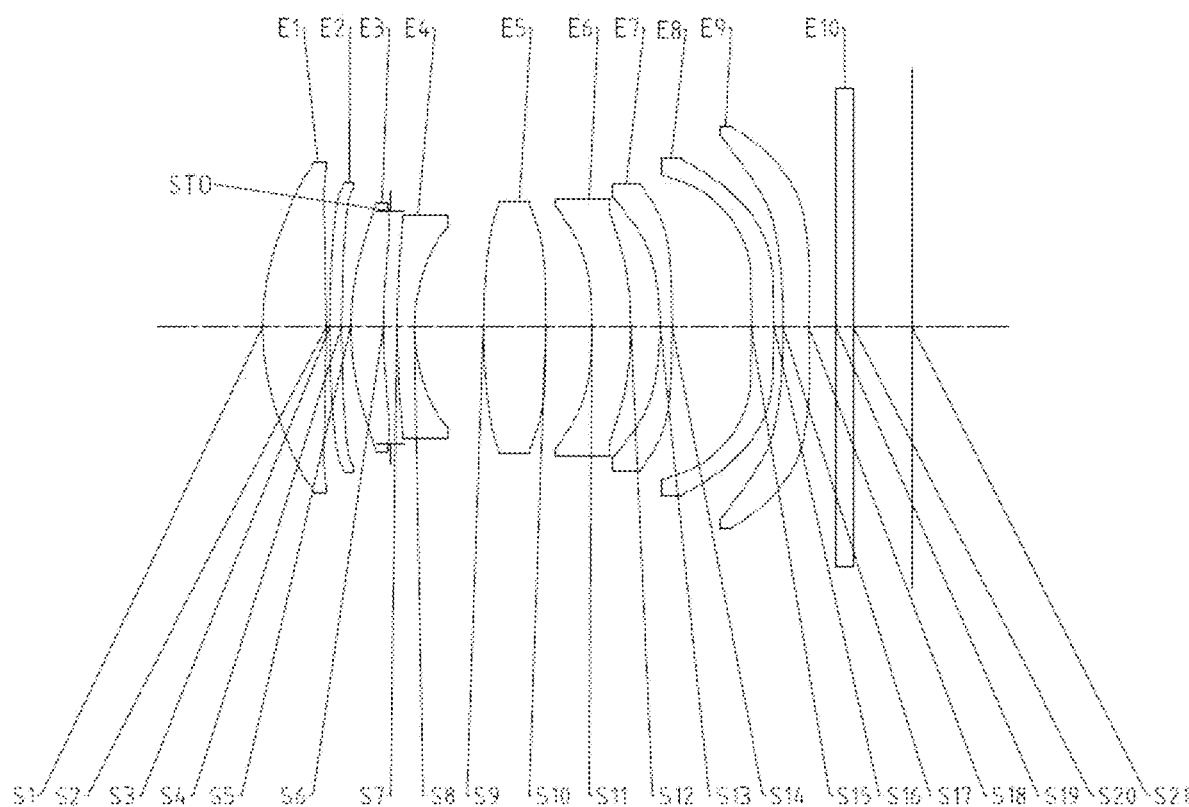
FIG. 36 shows a structural schematic diagram of a camera lens assembly according to Embodiment 8 of the disclosure.

FIG. 36 shows a structural schematic diagram of a camera lens assembly according to Embodiment 8 of the disclosure. As shown in FIG. 36, the camera lens assembly sequentially includes from an object-side surface to an image-side surface, a diaphragm STO, a first lens E1, a second lens E2, a third lens E3, a fourth lens E4, a fifth lens E5, a sixth lens E6, a seventh lens E7, an eighth lens E8, a ninth lens E9, an optical filter E10 and an imaging surface S21.

The first lens E1 has a positive refractive power, an object-side surface S1 thereof is a convex surface, and an image-side surface S2 thereof is a convex surface. The second lens E2 has a negative refractive power, an object-side surface S3 thereof is a convex surface, and an image-side surface S4 thereof is a concave surface. The third lens E3 has a positive refractive power, an object-side surface S5 thereof is a convex surface, and an image-side surface S6 thereof is a concave surface. The fourth lens E4 has a negative refractive power, an object-side surface S7 thereof is a convex surface, and an image-side surface S8 thereof is a concave surface. The fifth lens E5 has a positive refractive power, an object-side surface S9 thereof is a convex surface, and an image-side surface S10 thereof is a convex surface. The sixth lens E6 has a positive refractive power, an object-side surface S11 thereof is a concave surface, and an image-side surface S12 thereof is a convex surface. The seventh lens E7 has a negative refractive power, an object-side surface S13 thereof is a concave surface, and an image-side surface S14 thereof is a convex surface. The eighth lens E8 has a positive refractive power, an object-side surface S15 thereof is a concave surface, and an image-side surface S16 thereof is a convex surface. The ninth lens E9 has a negative refractive power, an object-side surface S17 thereof is a convex surface, and an image-side surface S18 thereof is a concave surface. The optical filter E10 has an object-side surface S18 and an image-side surface S20. Light from an object sequentially penetrates through each of the surfaces S1 to S20 and is finally imaged on the imaging surface S21.

In Embodiment 8 of the disclosure, explanations about parameters of each relational expression are the same as those in Embodiment 1, and numerical values of each relational expression are listed in the following Table 21.

TABLE 21

| Embodiment 8 | | | |
|---|---|---|---|
| TTL (mm) | 14.34 | ImgH (mm) | 5.70 |
| FOV(°) | 40.5 | TTL/f | 0.94 |
| f7/f9 | 0.89 | f1/f | 0.63 |
| R13/f | −0.38 | DT92/TD | 0.37 |
| DT32/DT41 | 1.07 | R8/f4 | −0.51 |
| CT5/ΣCT | 0.22 | DT11/ImgH | 0.64 |
| CT6/CT7 | 3.31 | CT3/ET3 | 2.78 |
| R11/R12 | 1.41 | SAG51/CT5 | 0.25 |
| Tr9r12/Tr13r18 | 0.99 | CT2/CT3 | 0.36 |
| BFL/TTL | 0.16 | 10 × (T45 + T56 + T67)/TTL | 2.23 |

Table 22 shows basic parameters of the camera lens assembly of Embodiment 8 of the disclosure, wherein the units of the curvature radius, the thickness and the focal length are all millimeters.

TABLE 22

| Surface number | Surface type | Curvature radius | Thickness | Focal length | Refractive index | Abbe number | Conic coefficient |
|---|---|---|---|---|---|---|---|
| OBJ | Spherical | Infinite | Infinite | | | | |
| S1 | Aspheric | 5.4790 | 1.4050 | 9.56 | 1.55 | 56.1 | −0.3548 |
| S2 | Aspheric | −100.0000 | 0.0779 | | | | −98.6551 |
| S3 | Aspheric | 34.6102 | 0.2600 | −463.40 | 1.65 | 23.5 | 98.4573 |
| S4 | Aspheric | 30.9250 | 0.2006 | | | | 97.9819 |
| S5 | Aspheric | 6.0383 | 0.7232 | 18.69 | 1.55 | 56.1 | 0.2567 |
| S6 | Aspheric | 14.1606 | 0.1548 | | | | 10.0831 |
| STO | Spherical | Infinite | 0.1397 | | | | |
| S7 | Aspheric | 17.5095 | 0.3845 | −7.52 | 1.66 | 21.5 | −59.2954 |
| S8 | Aspheric | 3.8172 | 1.5384 | | | | −0.1942 |
| S9 | Aspheric | 13.9044 | 1.3733 | 20.22 | 1.65 | 23.5 | −2.6710 |
| S10 | Aspheric | −200.5127 | 1.0156 | | | | 96.4236 |
| S11 | Aspheric | −13.8593 | 0.8606 | 47.89 | 1.66 | 21.5 | 15.8140 |
| S12 | Aspheric | −9.8552 | 0.6483 | | | | 1.5258 |
| S13 | Aspheric | −5.7718 | 0.2600 | −13.52 | 1.55 | 56.1 | 1.5260 |
| S14 | Aspheric | −26.9085 | 1.7499 | | | | 47.0492 |
| S15 | Aspheric | −58.9114 | 0.5083 | 34.92 | 1.55 | 56.1 | −99.0000 |
| S16 | Aspheric | −14.4481 | 0.1958 | | | | 13.2598 |
| S17 | Aspheric | 185.6045 | 0.5726 | −15.26 | 1.55 | 56.1 | 26.0633 |
| S18 | Aspheric | 7.9637 | 0.5988 | | | | −99.0000 |
| S19 | Spherical | Infinite | 0.3812 | | 1.52 | 64.2 | |
| S20 | Spherical | Infinite | 1.2928 | | | | |
| S21 | Spherical | Infinite | | | | | |

The following Table 23 shows higher-order coefficients A4, A6, A8, A10, A12, A14, A16 and A18 applied to each of the aspheric mirror surfaces S1-S18 of the aspheric lenses in Embodiment 8 of the disclosure. A surface type of each aspheric mirror surface may be defined by the formula (1) given in Embodiment 1.

TABLE 23

| Surface number | A4 | A6 | A8 | A10 | A12 | A14 | A16 | A18 |
|---|---|---|---|---|---|---|---|---|
| S1 | −8.7893E−04 | −1.0661E−04 | 3.2081E−05 | −1.2376E−05 | 2.5819E−06 | −2.7902E−07 | 1.5195E−08 | −3.2507E−10 |
| S2 | 2.3375E−03 | −2.6499E−03 | 8.9527E−04 | −1.5612E−04 | 1.6031E−05 | −9.8541E−07 | 3.4514E−08 | −5.4646E−10 |
| S3 | 5.6682E−03 | −3.4320E−03 | 8.3309E−04 | −5.0384E−05 | −1.4143E−05 | 3.0172E−06 | −2.2458E−07 | 6.1134E−09 |
| S4 | 1.0139E−03 | −1.0387E−03 | 2.0605E−04 | 3.8510E−05 | −2.2929E−05 | 3.8386E−06 | −2.8651E−07 | 8.2563E−09 |
| S5 | −1.9988E−03 | −3.2968E−05 | 1.4225E−04 | −1.8682E−05 | −2.9808E−06 | 9.7061E−07 | −1.1584E−07 | 5.4147E−09 |
| S6 | 1.9368E−03 | −6.5564E−04 | −8.3230E−04 | 5.0858E−04 | −1.4017E−04 | 2.0577E−05 | −1.5652E−06 | 4.8744E−08 |
| S7 | −5.4402E−04 | 2.1636E−03 | −2.1577E−03 | 1.0452E−03 | −2.9202E−04 | 4.7511E−05 | −4.1467E−06 | 1.4997E−07 |
| S8 | −4.5027E−03 | 3.6834E−03 | −2.1614E−03 | 1.0423E−03 | −3.2209E−04 | 6.0052E−05 | −5.9865E−06 | 2.4066E−07 |
| S9 | −1.4831E−03 | 5.7178E−04 | 6.6117E−05 | −6.8214E−05 | 1.9222E−05 | −2.9690E−06 | 2.5442E−07 | −8.9541E−09 |
| S10 | −8.4390E−03 | 9.0834E−04 | −1.2592E−04 | 1.4030E−05 | −8.5761E−06 | 2.1420E−06 | −2.2198E−07 | 9.2159E−09 |
| S11 | −1.5527E−02 | 4.4382E−05 | 2.6426E−04 | 5.1118E−05 | −4.5462E−05 | 9.1552E−06 | −7.4209E−07 | 2.1609E−08 |
| S12 | −4.8954E−03 | −1.0481E−03 | 1.4675E−04 | 1.5068E−04 | −6.0179E−05 | 1.0320E−05 | −8.7064E−07 | 2.9856E−08 |
| S13 | 1.8577E−02 | −1.1173E−02 | 2.4177E−03 | −2.2046E−04 | −1.6775E−05 | 6.8747E−06 | −7.0771E−07 | 2.6400E−08 |
| S14 | 1.1473E−02 | −8.9969E−03 | 2.5076E−03 | −4.4003E−04 | 5.0498E−05 | −3.7027E−06 | 1.5775E−07 | −2.9515E−09 |
| S15 | 1.0615E−02 | −1.4451E−02 | 3.6605E−03 | −4.6899E−04 | 2.7162E−05 | 4.0632E−07 | −1.4247E−07 | 5.3579E−09 |
| S16 | 2.9452E−02 | −2.2402E−02 | 6.5887E−03 | −1.1978E−03 | 1.3862E−04 | −9.7678E−06 | 3.7745E−07 | −6.0822E−09 |
| S17 | −3.0548E−02 | 1.0791E−02 | −1.9981E−03 | 1.8568E−04 | −8.3664E−06 | 1.1777E−07 | 3.1831E−09 | −9.1743E−11 |
| S18 | −3.5084E−02 | 1.1949E−02 | −2.2588E−03 | 2.5171E−04 | −1.7723E−05 | 7.8351E−07 | −1.9893E−08 | 2.2031E−10 |

Figure 37:
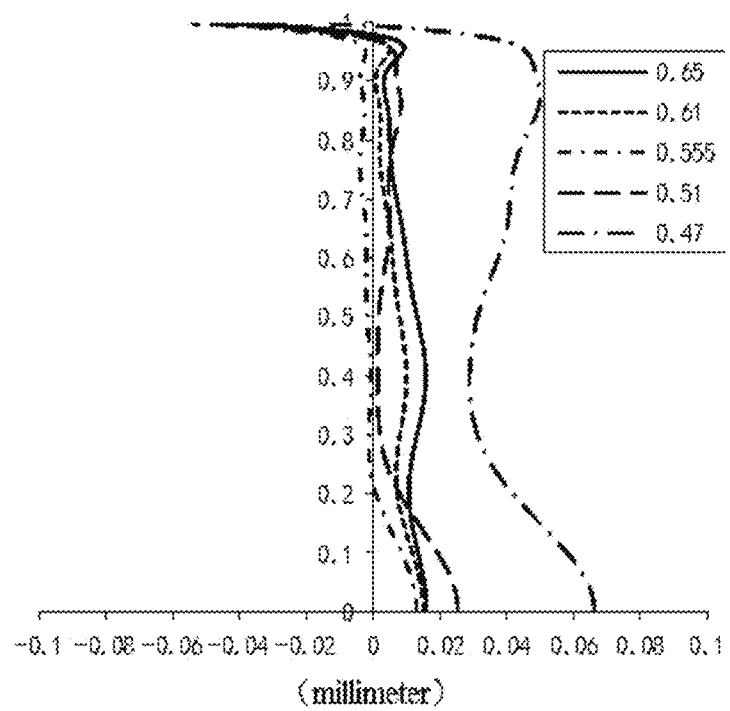
FIGS. 37-40 show a longitudinal aberration curve, an astigmatism curve, a distortion curve and a relative illumination curve of a camera lens assembly according to Embodiment 8 of the disclosure.
Figure 38:
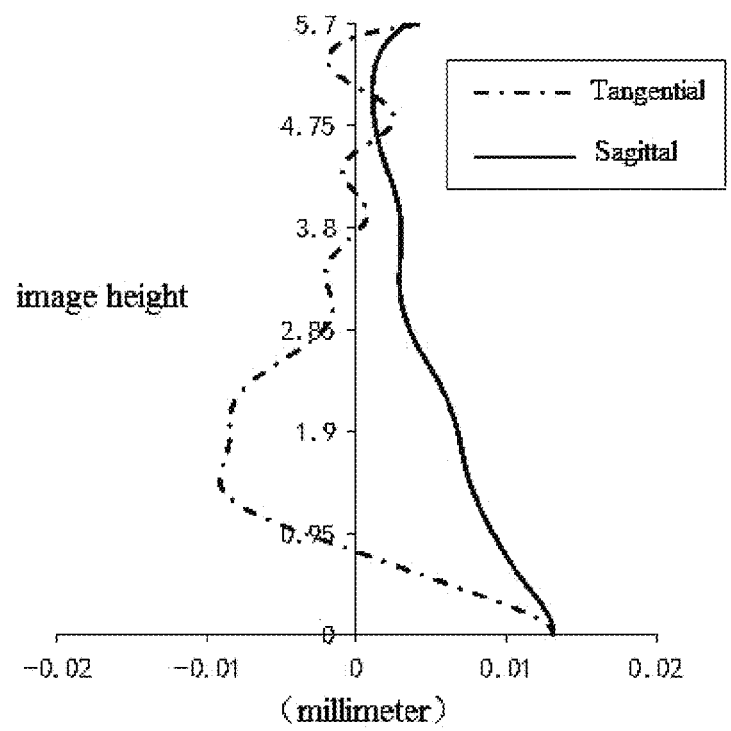
Figure 39:
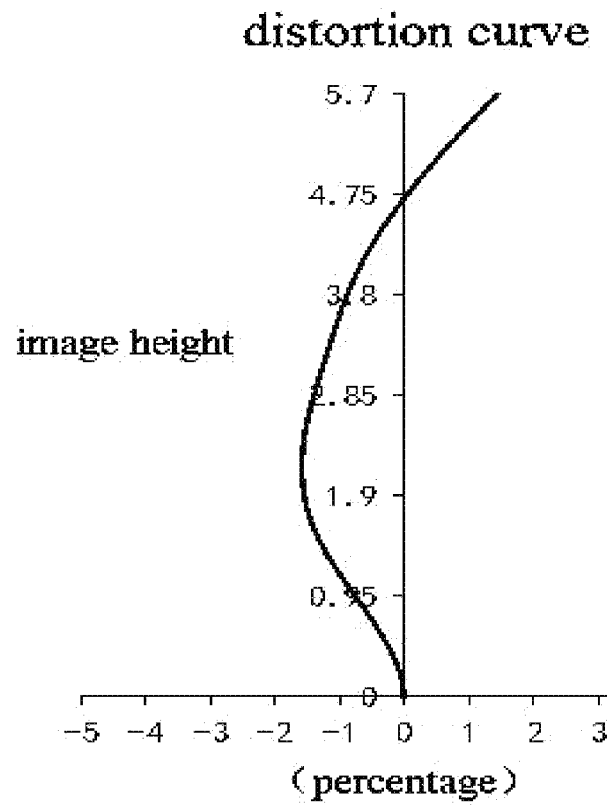
Figure 40:
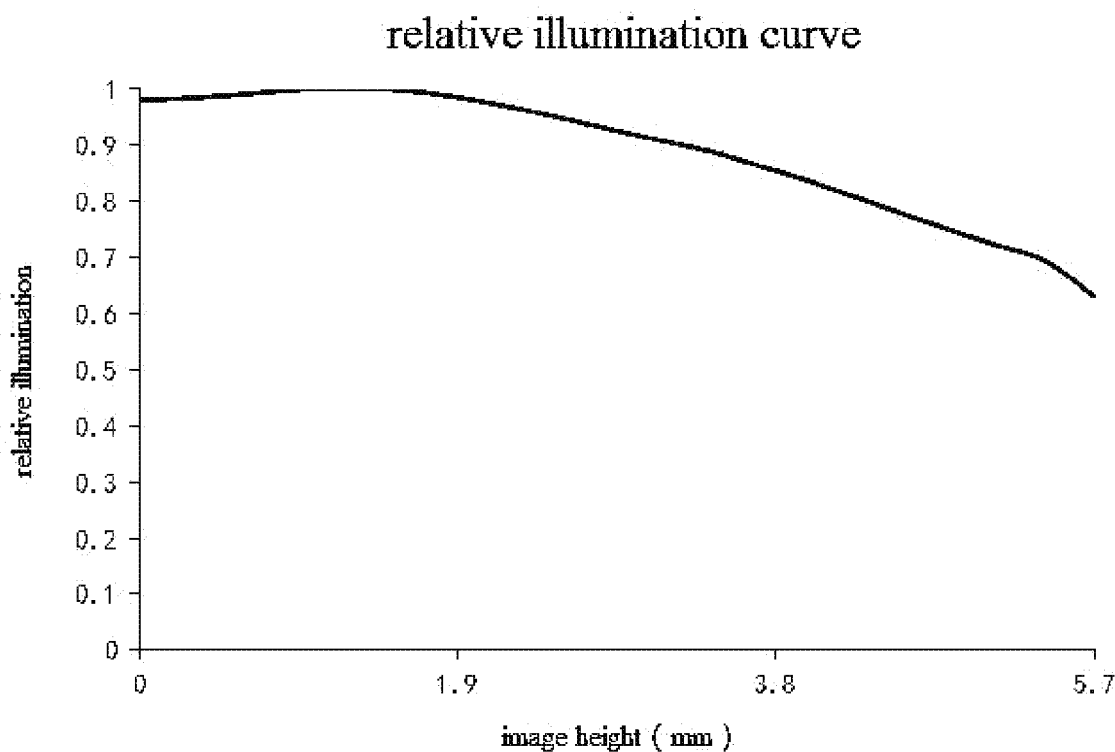

FIG. 37 shows a longitudinal aberration curve of the camera lens assembly according to Embodiment 8 of the disclosure to represent deviation of a convergence focal point after light with different wavelengths passes through the lens. FIG. 38 shows an astigmatism curve of the camera lens assembly according to Embodiment 8 of the disclosure to represent a curvature of tangential image surface and a curvature of sagittal image surface. FIG. 39 shows a distortion curve of the camera lens assembly according to Embodiment 8 of the disclosure to represent distortion values corresponding to different image heights. FIG. 40 shows a relative illumination curve of the camera lens assembly according to Embodiment 8 of the disclosure to represent relative illuminations corresponding to different image heights on the imaging surface after the light passes through the lens. According to FIGS. 37-40, it can be seen that the camera lens assembly provided in Embodiment 8 of the disclosure may achieve good imaging quality.

The above description is only description about the preferred embodiments of the disclosure and adopted technical principles. It is understood by those skilled in the art that the scope of disclosure involved in the disclosure is not limited to the technical solutions formed by specifically combining the technical features and should also cover other technical solutions formed by freely combining the technical features or equivalent features thereof without departing from the inventive concept, for example, technical solutions formed by mutually replacing the features and (but not limited to) the technical features with similar functions disclosed in the disclosure.

What is claimed is:

1. A camera lens assembly, comprising nine lenses, the nine lenses sequentially comprise from an object side to an image side:
   a first lens with a positive refractive power, an object-side surface thereof is a convex surface;
   a second lens with a refractive power;
   a third lens with a positive refractive power;
   a fourth lens with a negative refractive power;
   a fifth lens with a positive refractive power;
   a sixth lens with a refractive power;
   a seventh lens with a negative refractive power, an image-side surface of the seventh lens is a concave surface;
   an eighth lens with a positive refractive power; and
   a ninth lens with a negative refractive power;
   wherein an on-axis distance TTL from an object-side surface of the first lens to an imaging surface of the camera lens assembly and an effective focal length f of the camera lens assembly satisfy TTL/f<1.1;
   a distance Tr9r12 from an object-side surface of the fifth lens to an image-side surface of the sixth lens on the optical axis and a distance Tr13r18 from an object-side surface of the seventh lens to an image-side surface of the ninth lens on the optical axis satisfy 0.9<Tr9r12/Tr13r18<1.6.

2. The camera lens assembly according to claim 1, wherein an effective focal length f7 of the seventh lens and an effective focal length f9 of the ninth lens satisfy 0.7<f7/f9<1.3.

3. The camera lens assembly according to claim 1, wherein an effective focal length f1 of the first lens and the effective focal length f of the camera lens assembly satisfy 0.5<f1/f<1.

4. The camera lens assembly according to claim 1, wherein a curvature radius R13 of an object-side surface of the seventh lens and the effective focal length f of the camera lens assembly satisfy −5<R13/f<0.

5. The camera lens assembly according to claim 1, wherein a maximum effective semi-diameter DT92 of an image-side surface of the ninth lens and an on-axis distance TD from the object-side surface of the first lens to the image-side surface of the ninth lens satisfy DT92/TD<0.5.

6. The camera lens assembly according to claim 1, wherein an on-axis distance BFL from an image-side surface of the ninth lens to an imaging surface of the camera lens assembly and the on-axis distance TTL from the object-side surface of the first lens to the imaging surface of the camera lens assembly satisfy 0.1<BFL/TTL<0.25.

7. The camera lens assembly according to claim 1, wherein a curvature radius R8 of an image-side surface of the fourth lens and an effective focal length f4 of the fourth lens satisfy $-0.7<R8/f4<-0.2$.

8. The camera lens assembly according to claim 1, wherein a center thickness CT5 of the fifth lens and a sum $\Sigma CT$ of respective thicknesses of the first lens to the ninth lens on an optical axis satisfy $0.15<CT5/\Sigma CT<0.5$.

9. The camera lens assembly according to claim 1, wherein ImgH is a half the diagonal length of an effective pixel area of the electronic photosensitive element, ImgH and a maximum effective semi-diameter DT11 of the object-side surface of the first lens satisfy $0.5<DT11/ImgH<1$.

10. The camera lens assembly according to claim 1, wherein a center thickness CT6 of the sixth lens and a center thickness CT7 of the seventh lens satisfy $2<CT6/CT7<3.5$.

11. The camera lens assembly according to claim 1, wherein a center thickness CT3 of the third lens and an edge thickness ET3 of the third lens satisfy $1.8<CT3/ET3<3$.

12. The camera lens assembly according to claim 1, wherein a curvature radius R11 of an object-side surface of the sixth lens and a curvature radius R12 of an image-side surface of the sixth lens satisfy $0.9<R11/R12<1.5$.

13. The camera lens assembly according to claim 1, wherein SAG51 is a spacing distance from an intersection point of an object-side surface of the fifth lens and the optical axis to an effective radius vertex of the object-side surface of the fifth lens on the optical axis, SAG51 and a center thickness CT5 of the fifth lens satisfy $0.1<SAG51/CT5<0.5$.

14. The camera lens assembly according to claim 1, wherein a center thickness CT2 of the second lens and a center thickness CT3 of the third lens satisfy $CT2/CT3<0.6$.

15. The camera lens assembly according to claim 1, wherein an on-axis distance BFL from an image-side surface of the ninth lens to an imaging surface of the camera lens assembly and the on-axis distance TTL from the object-side surface of the first lens to the imaging surface of the camera lens assembly satisfy $0.1<BFL/TTL<0.25$.

16. The camera lens assembly according to claim 1, wherein an on-axis spacing distance T45 from the fourth lens to the fifth lens, an on-axis spacing distance T56 from the fifth lens to the sixth lens, an on-axis spacing distance T67 from the sixth lens to the seventh lens and the on-axis distance TTL from the object-side surface of the first lens to the imaging surface of the camera lens assembly satisfy $2<10\times(T45+T56+T67)/TTL<3$.

17. A camera lens assembly, comprising nine lenses, the nine lenses sequentially comprise from an object side to an image side:
- a first lens with a positive refractive power, an object-side surface thereof is a convex surface;
- a second lens with a refractive power;
- a third lens with a positive refractive power;
- a fourth lens with a refractive power, an image-side surface thereof is a concave surface;
- a fifth lens with a negative refractive power;
- a sixth lens with a refractive power;
- a seventh lens with a negative refractive power, an image-side surface of the seventh lens is a concave surface;
- an eighth lens with a positive refractive power; and
- a ninth lens with a negative refractive power;
- wherein there is an air space between any two adjacent lenses;
- a distance Tr9r12 from an object-side surface of the fifth lens to an image-side surface of the sixth lens on the optical axis and a distance Tr13r18 from an object-side surface of the seventh lens to an image-side surface of the ninth lens on the optical axis satisfy $0.9<Tr9r12/Tr13r18<1.6$.

18. The camera lens assembly according to claim 17, wherein an image-side surface of the seventh lens is a concave surface; a curvature radius R13 of an object-side surface of the seventh lens and an effective focal length of the camera lens assembly satisfy $-5<R13/f<0$; and a maximum effective semi-diameter DT92 of an image-side surface of the ninth lens and an on-axis distance TD from the object-side surface of the first lens to an image-side surface of the ninth lens satisfy $DT92/TD<0.5$.

* * * * *